(12) United States Patent
Shustorovich et al.

(10) Patent No.: US 9,760,788 B2
(45) Date of Patent: Sep. 12, 2017

(54) MOBILE DOCUMENT DETECTION AND ORIENTATION BASED ON REFERENCE OBJECT CHARACTERISTICS

(71) Applicant: Kofax, Inc., Irvine, CA (US)

(72) Inventors: Alexander Shustorovich, Pittsford, NY (US); Christopher W. Thrasher, Rochester, NY (US); Jiyong Ma, San Diego, CA (US); Anthony Macciola, Irvine, CA (US); Jan W. Amtrup, Silver Spring, MD (US)

(73) Assignee: KOFAX, INC., Irvine, CA (US)

( * ) Notice: Subject to any disclaimer, the term of this patent is extended or adjusted under 35 U.S.C. 154(b) by 0 days.

(21) Appl. No.: 14/927,359

(22) Filed: Oct. 29, 2015

(65) Prior Publication Data

US 2016/0125613 A1    May 5, 2016

Related U.S. Application Data

(60) Provisional application No. 62/072,968, filed on Oct. 30, 2014.

(51) Int. Cl.
*G06K 9/32* (2006.01)
*G06K 9/00* (2006.01)
*G06K 9/18* (2006.01)

(52) U.S. Cl.
CPC ....... *G06K 9/3208* (2013.01); *G06K 9/00463* (2013.01); *G06K 9/186* (2013.01)

(58) Field of Classification Search
None
See application file for complete search history.

(56) References Cited

U.S. PATENT DOCUMENTS 1,660,102 A    2/1928 Appelt et al.
3,069,654 A   12/1962 Hough
(Continued)

FOREIGN PATENT DOCUMENTS

CN    101052991 A    10/2007
EP      0549329 A2     6/1993
(Continued)

OTHER PUBLICATIONS

Office Action from Japanese Patent Application No. 2014-552356, dated Jun. 2, 2015.
(Continued)

*Primary Examiner* — Michelle M Hausmann
(74) *Attorney, Agent, or Firm* — Zilka-Kotab, P.C.

(57) ABSTRACT

In various embodiments, methods, systems, and computer program products for detecting, estimating, calculating, etc. characteristics of a document based on reference objects depicted on the document are disclosed. In one approach, a computer-implemented method for processing a digital image depicting a document includes analyzing the digital image to determine one or more of a presence and a location of one or more reference objects; determining one or more geometric characteristics of at least one of the reference objects; defining one or more region(s) of interest based at least in part on one or more of the determined geometric characteristics; and detecting a presence or an absence of an edge of the document within each defined region of interest. Additional embodiments leverage the type of document depicted in the image, multiple frames of image data, and/or calculate or extrapolate document edges rather than locating edges in the image.

19 Claims, 11 Drawing Sheets

(56) References Cited

U.S. PATENT DOCUMENTS

| | | |
|---|---|---|
| 3,696,599 A | 10/1972 | Palmer et al. |
| 4,558,461 A | 12/1985 | Schlang |
| 4,651,287 A | 3/1987 | Tsao |
| 4,656,665 A | 4/1987 | Pennebaker |
| 4,836,026 A | 6/1989 | P'an et al. |
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,101,448 A | 3/1992 | Kawachiya et al. |
| 5,124,810 A | 6/1992 | Seto |
| 5,151,260 A | 9/1992 | Contursi et al. |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,293,429 A | 3/1994 | Pizano et al. |
| 5,313,527 A | 5/1994 | Guberman et al. |
| 5,317,646 A | 5/1994 | Sang, Jr. et al. |
| 5,321,770 A | 6/1994 | Huttenlocher et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,586,199 A | 12/1996 | Kanda et al. |
| 5,594,815 A | 1/1997 | Fast et al. |
| 5,596,655 A | 1/1997 | Lopez |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,680,525 A | 10/1997 | Sakai et al. |
| 5,696,611 A | 12/1997 | Nishimura et al. |
| 5,696,805 A | 12/1997 | Gaborski et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,760,912 A | 6/1998 | Itoh |
| 5,781,665 A | 7/1998 | Cullen et al. |
| 5,818,978 A | 10/1998 | Al-Hussein |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,857,029 A * | 1/1999 | Patel .................. G06K 9/00154 382/119 |
| 5,867,264 A | 2/1999 | Hinnrichs |
| 5,923,763 A | 7/1999 | Walker et al. |
| 5,937,084 A | 8/1999 | Crabtree et al. |
| 5,953,388 A | 9/1999 | Walnut et al. |
| 5,956,468 A | 9/1999 | Ancin |
| 5,987,172 A | 11/1999 | Michael |
| 6,002,489 A | 12/1999 | Murai et al. |
| 6,005,958 A | 12/1999 | Farmer et al. |
| 6,005,968 A | 12/1999 | Granger |
| 6,009,191 A | 12/1999 | Julier |
| 6,009,196 A | 12/1999 | Mahoney |
| 6,011,595 A | 1/2000 | Henderson et al. |
| 6,016,361 A | 1/2000 | Hongu et al. |
| 6,038,348 A | 3/2000 | Carley |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,098,065 A | 8/2000 | Skillen et al. |
| 6,104,830 A | 8/2000 | Schistad |
| 6,104,840 A | 8/2000 | Ejiri et al. |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,215,469 B1 | 4/2001 | Mori et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,396,599 B1 | 5/2002 | Patton et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,426,806 B2 | 7/2002 | Melen |
| 6,433,896 B1 | 8/2002 | Ueda et al. |
| 6,456,738 B1 | 9/2002 | Tsukasa |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,628,808 B1 | 9/2003 | Bach et al. |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,729,733 B1 | 5/2004 | Raskar et al. |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |
| 6,765,685 B1 | 7/2004 | Yu |
| 6,778,684 B1 | 8/2004 | Bollman |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,816,187 B1 | 11/2004 | Iwai et al. |
| 6,826,311 B2 | 11/2004 | Wilt |
| 6,831,755 B1 | 12/2004 | Narushima et al. |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |

(56) References Cited

U.S. PATENT DOCUMENTS

| | | |
|---|---|---|
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 6,999,625 B1 | 2/2006 | Nelson |
| 7,006,707 B2 | 2/2006 | Peterson |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,054,036 B2 | 5/2006 | Hirayama |
| 7,081,975 B2 | 7/2006 | Yoda et al. |
| 7,082,426 B2 | 7/2006 | Musgrove et al. |
| 7,107,285 B2 | 9/2006 | von Kaenel et al. |
| 7,123,292 B1 | 10/2006 | Seeger et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,167,281 B1 | 1/2007 | Fujimoto et al. |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |
| 7,228,314 B2 | 6/2007 | Kawamoto et al. |
| 7,249,717 B2 | 7/2007 | Kotovich et al. |
| 7,251,777 B1 | 7/2007 | Valtchev et al. |
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,286,177 B2 | 10/2007 | Cooper |
| 7,298,897 B1 | 11/2007 | Dominguez et al. |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Buttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,542,931 B2 | 6/2009 | Black et al. |
| 7,545,529 B2 | 6/2009 | Borrey et al. |
| 7,553,095 B2 | 6/2009 | Kimura |
| 7,562,060 B2 | 7/2009 | Sindhwani et al. |
| 7,580,557 B2 | 8/2009 | Zavadsky et al. |
| 7,636,479 B2 | 12/2009 | Luo et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,702,162 B2 | 4/2010 | Cheong et al. |
| 7,735,721 B1 * | 6/2010 | Ma ................ G06Q 20/042 |
| | | 235/379 |
| 7,738,730 B2 | 6/2010 | Hawley |
| 7,739,127 B1 | 6/2010 | Hall |
| 7,761,391 B2 | 7/2010 | Schmidtler et al. |
| 7,778,457 B2 | 8/2010 | Nepomniachtchi et al. |
| 7,782,384 B2 | 8/2010 | Kelly |
| 7,787,695 B2 | 8/2010 | Nepomniachtchi et al. |
| 7,937,345 B2 | 5/2011 | Schmidtler et al. |
| 7,941,744 B2 | 5/2011 | Oppenlander et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,035,641 B1 | 10/2011 | O'Donnell |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,081,227 B1 | 12/2011 | Kim et al. |
| 8,094,976 B2 | 1/2012 | Berard et al. |
| 8,135,656 B2 | 3/2012 | Evanitsky |
| 8,136,114 B1 | 3/2012 | Gailloux et al. |
| 8,184,156 B2 | 5/2012 | Mino et al. |
| 8,194,965 B2 | 6/2012 | Lossev et al. |
| 8,213,687 B2 | 7/2012 | Fan |
| 8,238,880 B2 | 8/2012 | Jin et al. |
| 8,239,335 B2 | 8/2012 | Schmidtler et al. |
| 8,244,031 B2 | 8/2012 | Cho et al. |
| 8,265,422 B1 | 9/2012 | Jin |
| 8,279,465 B2 | 10/2012 | Couchman |
| 8,295,599 B2 | 10/2012 | Katougi et al. |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,433,775 B2 | 4/2013 | Buchhop et al. |
| 8,441,548 B1 | 5/2013 | Nechyba et al. |
| 8,443,286 B2 | 5/2013 | Cameron |
| 8,452,098 B2 | 5/2013 | Nepomniachtchi et al. |
| 8,478,052 B1 | 7/2013 | Yee et al. |
| 8,483,473 B2 | 7/2013 | Roach et al. |
| 8,503,797 B2 | 8/2013 | Turkelson et al. |
| 8,515,163 B2 | 8/2013 | Cho et al. |
| 8,515,208 B2 | 8/2013 | Minerich |
| 8,526,739 B2 | 9/2013 | Schmidtler et al. |
| 8,532,374 B2 * | 9/2013 | Chen ................ G06K 9/00463 |
| | | 382/164 |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,587,818 B2 | 11/2013 | Imaizumi et al. |
| 8,620,058 B2 | 12/2013 | Nepomniachtchi et al. |
| 8,639,621 B1 | 1/2014 | Ellis et al. |
| 8,675,953 B1 | 3/2014 | Elwell et al. |
| 8,676,165 B2 | 3/2014 | Cheng et al. |
| 8,677,249 B2 | 3/2014 | Buttner et al. |
| 8,693,043 B2 | 4/2014 | Schmidtler et al. |
| 8,705,836 B2 | 4/2014 | Gorski et al. |
| 8,719,197 B2 | 5/2014 | Schmidtler et al. |
| 8,745,488 B1 | 6/2014 | Wong |
| 8,749,839 B2 | 6/2014 | Borrey et al. |

(56) References Cited

U.S. PATENT DOCUMENTS

| | | |
|---|---|---|
| 8,774,516 B2 | 7/2014 | Amtrup et al. |
| 8,805,125 B1 | 8/2014 | Kumar et al. |
| 8,813,111 B2 | 8/2014 | Guerin et al. |
| 8,823,991 B2 | 9/2014 | Borrey et al. |
| 8,855,375 B2 | 10/2014 | Macciola et al. |
| 8,855,425 B2 | 10/2014 | Schmidtler et al. |
| 8,879,120 B2 | 11/2014 | Thrasher et al. |
| 8,879,783 B1 | 11/2014 | Wang et al. |
| 8,879,846 B2 | 11/2014 | Amtrup et al. |
| 8,885,229 B1 | 11/2014 | Amtrup et al. |
| 8,908,977 B2 | 12/2014 | King |
| 8,955,743 B1 | 2/2015 | Block et al. |
| 8,971,587 B2 | 3/2015 | Macciola et al. |
| 8,989,515 B2 | 3/2015 | Shustorovich et al. |
| 8,995,012 B2 | 3/2015 | Heit et al. |
| 8,995,769 B2 | 3/2015 | Carr |
| 9,058,515 B1 | 6/2015 | Amtrup et al. |
| 9,058,580 B1 | 6/2015 | Amtrup et al. |
| 9,064,316 B2 | 6/2015 | Eid et al. |
| 9,117,117 B2 | 8/2015 | Macciola et al. |
| 9,129,210 B2 | 9/2015 | Borrey et al. |
| 9,137,417 B2 | 9/2015 | Macciola et al. |
| 9,141,926 B2 | 9/2015 | Kilby et al. |
| 9,158,967 B2 | 10/2015 | Shustorovich et al. |
| 9,165,187 B2 | 10/2015 | Macciola et al. |
| 9,165,188 B2 | 10/2015 | Thrasher et al. |
| 9,208,536 B2 | 12/2015 | Macciola et al. |
| 9,253,349 B2 | 2/2016 | Amtrup et al. |
| 9,275,281 B2 | 3/2016 | Macciola |
| 9,311,531 B2 | 4/2016 | Amtrup et al. |
| 9,342,741 B2 | 5/2016 | Amtrup et al. |
| 9,342,742 B2 | 5/2016 | Amtrup et al. |
| 9,355,312 B2 | 5/2016 | Amtrup et al. |
| 9,373,057 B1 * | 6/2016 | Erhan .................. G06K 9/6202 |
| 9,514,357 B2 | 12/2016 | Macciola et al. |
| 9,576,272 B2 | 2/2017 | Macciola et al. |
| 9,584,729 B2 | 2/2017 | Amtrup et al. |
| 2001/0027420 A1 | 10/2001 | Boublik et al. |
| 2002/0030831 A1 | 3/2002 | Kinjo |
| 2002/0054693 A1 | 5/2002 | Elmenhurst |
| 2002/0069218 A1 | 6/2002 | Sull et al. |
| 2002/0113801 A1 | 8/2002 | Reavy et al. |
| 2002/0122071 A1 | 9/2002 | Camara et al. |
| 2002/0126313 A1 | 9/2002 | Namizuka |
| 2002/0165717 A1 | 11/2002 | Solmer et al. |
| 2003/0002068 A1 | 1/2003 | Constantin et al. |
| 2003/0007683 A1 | 1/2003 | Wang et al. |
| 2003/0026479 A1 | 2/2003 | Thomas et al. |
| 2003/0030638 A1 | 2/2003 | Astrom et al. |
| 2003/0044012 A1 | 3/2003 | Eden |
| 2003/0046445 A1 | 3/2003 | Witt et al. |
| 2003/0053696 A1 | 3/2003 | Schmidt et al. |
| 2003/0063213 A1 | 4/2003 | Poplin |
| 2003/0086615 A1 | 5/2003 | Dance et al. |
| 2003/0095709 A1 | 5/2003 | Zhou |
| 2003/0101161 A1 | 5/2003 | Ferguson et al. |
| 2003/0117511 A1 | 6/2003 | Belz et al. |
| 2003/0120653 A1 | 6/2003 | Brady et al. |
| 2003/0142328 A1 | 7/2003 | McDaniel et al. |
| 2003/0151674 A1 | 8/2003 | Lin |
| 2003/0156201 A1 | 8/2003 | Zhang |
| 2003/0197063 A1 | 10/2003 | Longacre |
| 2003/0210428 A1 | 11/2003 | Bevlin et al. |
| 2003/0223615 A1 | 12/2003 | Keaton et al. |
| 2004/0019274 A1 | 1/2004 | Galloway et al. |
| 2004/0021909 A1 | 2/2004 | Kikuoka |
| 2004/0022437 A1 | 2/2004 | Beardsley |
| 2004/0049401 A1 | 3/2004 | Carr et al. |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0223640 A1 | 11/2004 | Bovyrin |
| 2004/0245334 A1 | 12/2004 | Sikorski |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0180632 A1 | 8/2005 | Aradhye et al. |
| 2005/0193325 A1 | 9/2005 | Epstein |
| 2005/0204058 A1 | 9/2005 | Philbrick et al. |
| 2005/0206753 A1 | 9/2005 | Sakurai et al. |
| 2005/0212925 A1 | 9/2005 | Lefebure et al. |
| 2005/0216426 A1 | 9/2005 | Weston et al. |
| 2005/0228591 A1 | 10/2005 | Hur et al. |
| 2005/0234955 A1 | 10/2005 | Zeng et al. |
| 2005/0246262 A1 | 11/2005 | Aggarwal et al. |
| 2005/0265618 A1 | 12/2005 | Jebara |
| 2005/0271265 A1 | 12/2005 | Wang et al. |
| 2005/0273453 A1 | 12/2005 | Holloran |
| 2006/0013463 A1 | 1/2006 | Ramsay et al. |
| 2006/0017810 A1 | 1/2006 | Kurzweil et al. |
| 2006/0023271 A1 | 2/2006 | Boay et al. |
| 2006/0031344 A1 | 2/2006 | Mishima et al. |
| 2006/0047704 A1 | 3/2006 | Gopalakrishnan |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0126918 A1 | 6/2006 | Oohashi et al. |
| 2006/0147113 A1 | 7/2006 | Han |
| 2006/0159364 A1 | 7/2006 | Poon et al. |
| 2006/0161646 A1 | 7/2006 | Chene et al. |
| 2006/0164682 A1 | 7/2006 | Lev |
| 2006/0195491 A1 | 8/2006 | Nieland et al. |
| 2006/0203107 A1 | 9/2006 | Steinberg et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0242180 A1 | 10/2006 | Graf et al. |
| 2006/0256371 A1 | 11/2006 | King et al. |
| 2006/0256392 A1 | 11/2006 | Van Hoof et al. |
| 2006/0257048 A1 | 11/2006 | Lin et al. |
| 2006/0262962 A1 | 11/2006 | Hull et al. |
| 2006/0263134 A1 | 11/2006 | Beppu |
| 2006/0265640 A1 | 11/2006 | Albornoz et al. |
| 2006/0268352 A1 | 11/2006 | Tanigawa et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |

(56) References Cited

U.S. PATENT DOCUMENTS

| | | |
|---|---|---|
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2006/0294154 A1 | 12/2006 | Shimizu |
| 2007/0002348 A1 | 1/2007 | Hagiwara |
| 2007/0002375 A1 | 1/2007 | Ng |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0172151 A1 | 7/2007 | Gennetten et al. |
| 2007/0177818 A1 | 8/2007 | Teshima et al. |
| 2007/0204162 A1 | 8/2007 | Rodriguez |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0004073 A1 | 1/2008 | John et al. |
| 2008/0005678 A1 | 1/2008 | Buttner et al. |
| 2008/0068452 A1 | 3/2008 | Nakao et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0095467 A1 | 4/2008 | Olszak et al. |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0147790 A1 | 6/2008 | Malaney et al. |
| 2008/0166025 A1 | 7/2008 | Thorne |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0199081 A1 | 8/2008 | Kimura et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0292144 A1 | 11/2008 | Kim |
| 2008/0294737 A1 | 11/2008 | Kim |
| 2008/0298718 A1 | 12/2008 | Liu et al. |
| 2009/0015687 A1 | 1/2009 | Shinkai et al. |
| 2009/0073266 A1 | 3/2009 | Abdellaziz Trimeche et al. |
| 2009/0089078 A1 | 4/2009 | Bursey |
| 2009/0103808 A1 | 4/2009 | Dey et al. |
| 2009/0132468 A1 | 5/2009 | Putivsky et al. |
| 2009/0132504 A1 | 5/2009 | Vegnaduzzo et al. |
| 2009/0141985 A1 | 6/2009 | Sheinin et al. |
| 2009/0154778 A1 | 6/2009 | Lei et al. |
| 2009/0159509 A1 | 6/2009 | Wojdyla et al. |
| 2009/0164889 A1* | 6/2009 | Piersol .................. G06F 17/24 715/255 |
| 2009/0175537 A1 | 7/2009 | Tribelhorn et al. |
| 2009/0185241 A1 | 7/2009 | Nepomniachtchi |
| 2009/0214112 A1 | 8/2009 | Borrey et al. |
| 2009/0225180 A1 | 9/2009 | Maruyama et al. |
| 2009/0228499 A1 | 9/2009 | Schmidtler et al. |
| 2009/0285445 A1 | 11/2009 | Vasa |
| 2009/0324025 A1 | 12/2009 | Camp, Jr. et al. |
| 2009/0324062 A1 | 12/2009 | Lim et al. |
| 2009/0327250 A1 | 12/2009 | Green et al. |
| 2010/0007751 A1 | 1/2010 | Icho et al. |
| 2010/0014769 A1 | 1/2010 | Lundgren |
| 2010/0060910 A1 | 3/2010 | Fechter |
| 2010/0060915 A1 | 3/2010 | Suzuki et al. |
| 2010/0062491 A1 | 3/2010 | Lehmbeck |
| 2010/0082491 A1 | 4/2010 | Rosenblatt et al. |
| 2010/0150424 A1 | 6/2010 | Nepomniachtchi et al. |
| 2010/0166318 A1 | 7/2010 | Ben-Horesh et al. |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0209006 A1 | 8/2010 | Grigsby et al. |
| 2010/0214584 A1 | 8/2010 | Takahashi |
| 2010/0232706 A1 | 9/2010 | Forutanpour |
| 2010/0280859 A1 | 11/2010 | Frederick, II |
| 2010/0331043 A1 | 12/2010 | Chapman et al. |
| 2011/0013039 A1 | 1/2011 | Aisaka et al. |
| 2011/0025842 A1 | 2/2011 | King et al. |
| 2011/0025860 A1 | 2/2011 | Katougi et al. |
| 2011/0032570 A1 | 2/2011 | Imaizumi et al. |
| 2011/0055033 A1 | 3/2011 | Chen et al. |
| 2011/0090337 A1 | 4/2011 | Klomp et al. |
| 2011/0091092 A1 | 4/2011 | Nepomniachtchi et al. |
| 2011/0116716 A1 | 5/2011 | Kwon et al. |
| 2011/0145178 A1 | 6/2011 | Schmidtler et al. |
| 2011/0182500 A1 | 7/2011 | Esposito et al. |
| 2011/0194127 A1* | 8/2011 | Nagakoshi ........... H04N 1/0044 358/1.9 |
| 2011/0196870 A1 | 8/2011 | Schmidtler et al. |
| 2011/0200107 A1 | 8/2011 | Ryu |
| 2011/0246076 A1 | 10/2011 | Su et al. |
| 2011/0249905 A1 | 10/2011 | Singh et al. |
| 2011/0279456 A1 | 11/2011 | Hiranuma et al. |
| 2011/0280450 A1 | 11/2011 | Nepomniachtchi et al. |
| 2011/0285873 A1 | 11/2011 | Showering |
| 2011/0285874 A1 | 11/2011 | Showering et al. |
| 2012/0008856 A1* | 1/2012 | Hewes ................ H04N 13/0022 382/154 |
| 2012/0019614 A1 | 1/2012 | Murray et al. |
| 2012/0038549 A1 | 2/2012 | Mandella et al. |
| 2012/0057756 A1* | 3/2012 | Yoon .................... G06K 9/6256 382/104 |
| 2012/0069131 A1 | 3/2012 | Abelow |
| 2012/0075442 A1 | 3/2012 | Vujic |
| 2012/0077476 A1 | 3/2012 | Paraskevakos et al. |
| 2012/0092329 A1 | 4/2012 | Koo et al. |
| 2012/0105662 A1 | 5/2012 | Staudacher et al. |
| 2012/0113489 A1 | 5/2012 | Heit et al. |
| 2012/0114249 A1 | 5/2012 | Conwell |
| 2012/0116957 A1 | 5/2012 | Zanzot et al. |
| 2012/0131139 A1 | 5/2012 | Siripurapu et al. |
| 2012/0134576 A1 | 5/2012 | Sharma et al. |
| 2012/0162527 A1 | 6/2012 | Baker |
| 2012/0194692 A1 | 8/2012 | Mers et al. |
| 2012/0215578 A1 | 8/2012 | Swierz, III et al. |
| 2012/0230577 A1 | 9/2012 | Calman et al. |
| 2012/0230606 A1 | 9/2012 | Sugiyama et al. |
| 2012/0236019 A1 | 9/2012 | Oh et al. |
| 2012/0272192 A1 | 10/2012 | Grossman et al. |
| 2012/0284122 A1 | 11/2012 | Brandis |
| 2012/0290421 A1 | 11/2012 | Qawami et al. |
| 2012/0293607 A1 | 11/2012 | Bhogal et al. |
| 2012/0300020 A1 | 11/2012 | Arth et al. |
| 2012/0301011 A1 | 11/2012 | Grzechnik |
| 2012/0308139 A1 | 12/2012 | Dhir |
| 2013/0004076 A1 | 1/2013 | Koo et al. |
| 2013/0022231 A1 | 1/2013 | Nepomniachtchi et al. |
| 2013/0027757 A1 | 1/2013 | Lee et al. |
| 2013/0057703 A1 | 3/2013 | Vu et al. |
| 2013/0060596 A1 | 3/2013 | Gu et al. |
| 2013/0073459 A1 | 3/2013 | Zacarias et al. |
| 2013/0088757 A1 | 4/2013 | Schmidtler et al. |
| 2013/0090969 A1 | 4/2013 | Rivere |
| 2013/0097157 A1 | 4/2013 | Ng et al. |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0142402 A1 | 6/2013 | Myers et al. |
| 2013/0152176 A1 | 6/2013 | Courtney et al. |

(56) References Cited

U.S. PATENT DOCUMENTS

| | | |
|---|---|---|
| 2013/0182002 A1 | 7/2013 | Macciola et al. |
| 2013/0182105 A1 | 7/2013 | Fahn et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0188865 A1 | 7/2013 | Saha et al. |
| 2013/0198358 A1 | 8/2013 | Taylor |
| 2013/0223762 A1 | 8/2013 | Nagamasa |
| 2013/0230246 A1 | 9/2013 | Nuggehalli |
| 2013/0251280 A1 | 9/2013 | Borrey et al. |
| 2013/0268378 A1 | 10/2013 | Yovin |
| 2013/0268430 A1 | 10/2013 | Lopez et al. |
| 2013/0271579 A1 | 10/2013 | Wang |
| 2013/0287265 A1 | 10/2013 | Nepomniachtchi et al. |
| 2013/0287284 A1 | 10/2013 | Nepomniachtchi et al. |
| 2013/0297353 A1 | 11/2013 | Strange et al. |
| 2013/0308832 A1 | 11/2013 | Schmidtler et al. |
| 2013/0329023 A1 | 12/2013 | Suplee, III et al. |
| 2014/0003721 A1 | 1/2014 | Saund |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0055826 A1 | 2/2014 | Hinski |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0172687 A1 | 6/2014 | Chirehdast |
| 2014/0181691 A1 | 6/2014 | Poornachandran et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270439 A1 | 9/2014 | Chen |
| 2014/0270536 A1 | 9/2014 | Amtrup et al. |
| 2014/0316841 A1 | 10/2014 | Kilby et al. |
| 2014/0317595 A1 | 10/2014 | Kilby et al. |
| 2014/0327940 A1 | 11/2014 | Amtrup et al. |
| 2014/0328520 A1 | 11/2014 | Macciola et al. |
| 2014/0333971 A1 | 11/2014 | Macciola et al. |
| 2014/0368890 A1 | 12/2014 | Amtrup et al. |
| 2014/0376060 A1* | 12/2014 | Bocharov .......... H04N 1/23 358/474 |
| 2015/0040001 A1 | 2/2015 | Kannan et al. |
| 2015/0040002 A1 | 2/2015 | Kannan et al. |
| 2015/0098628 A1 | 4/2015 | Macciola et al. |
| 2015/0120564 A1* | 4/2015 | Smith .......... G06Q 20/042 705/45 |
| 2015/0161765 A1* | 6/2015 | Kota .......... G06K 9/00442 382/139 |
| 2015/0170085 A1 | 6/2015 | Amtrup et al. |
| 2015/0324640 A1 | 11/2015 | Macciola et al. |
| 2015/0339526 A1 | 11/2015 | Macciola et al. |
| 2015/0347861 A1 | 12/2015 | Doepke et al. |
| 2015/0355889 A1 | 12/2015 | Kilby et al. |
| 2016/0019530 A1 | 1/2016 | Wang et al. |
| 2016/0028921 A1 | 1/2016 | Thrasher et al. |
| 2016/0034775 A1 | 2/2016 | Meadow et al. |
| 2016/0055395 A1 | 2/2016 | Macciola et al. |
| 2016/0112645 A1 | 4/2016 | Amtrup et al. |
| 2016/0171603 A1 | 6/2016 | Amtrup et al. |
| 2016/0217319 A1* | 7/2016 | Bhanu .......... G06K 9/00288 |
| 2016/0350592 A1 | 12/2016 | Ma et al. |
| 2017/0024629 A1 | 1/2017 | Thrasher et al. |
| 2017/0046788 A1 | 2/2017 | Macciola et al. |
| 2017/0103281 A1 | 4/2017 | Amtrup et al. |
| 2017/0104885 A1 | 4/2017 | Amtrup et al. |

FOREIGN PATENT DOCUMENTS

| | | |
|---|---|---|
| EP | 0723247 A1 | 7/1996 |
| EP | 0767578 A2 | 4/1997 |
| EP | 0809219 A2 | 11/1997 |
| EP | 0843277 A2 | 5/1998 |
| EP | 0936804 A2 | 8/1999 |
| EP | 1054331 A2 | 11/2000 |
| EP | 1128659 A1 | 8/2001 |
| EP | 1317133 A1 | 6/2003 |
| EP | 1319133 A1 | 6/2003 |
| EP | 1422520 A1 | 5/2004 |
| EP | 1422920 A2 | 5/2004 |
| EP | 1956518 A1 | 8/2008 |
| EP | 1959363 A2 | 8/2008 |
| EP | 1976259 A1 | 10/2008 |
| EP | 2107480 A1 | 10/2009 |
| EP | 2472372 A1 | 7/2012 |
| JP | H07260701 A | 10/1995 |
| JP | H0962826 A | 3/1997 |
| JP | H09116720 A | 5/1997 |
| JP | H11118444 A | 4/1999 |
| JP | 2000067065 A | 3/2000 |
| JP | 2000103628 A | 4/2000 |
| JP | 2000354144 A | 12/2000 |
| JP | 2001309128 A | 11/2001 |
| JP | 2002024258 A | 1/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2005018678 A | 1/2005 |
| JP | 2005085173 A | 3/2005 |
| JP | 2005173730 A | 6/2005 |
| JP | 2006031379 A | 2/2006 |
| JP | 2006209588 A | 8/2006 |
| JP | 2006330863 A | 12/2006 |
| JP | 200702670 A | 3/2007 |
| JP | 2008134683 A | 6/2008 |
| JP | 2011034387 A | 2/2011 |
| JP | 2011055467 A | 3/2011 |
| JP | 2012009033 A | 1/2012 |
| JP | 2012517637 A | 8/2012 |
| JP | 2013196357 A | 9/2013 |
| JP | 5462286 B2 | 4/2014 |
| TW | 401553 B | 8/2000 |
| WO | 9604749 A1 | 2/1996 |
| WO | 9847098 A1 | 10/1998 |
| WO | 9967731 A1 | 12/1999 |
| WO | 02/063812 A2 | 8/2002 |
| WO | 02063812 A2 | 8/2002 |
| WO | 2004053630 A2 | 6/2004 |
| WO | 2004056360 A1 | 7/2004 |
| WO | 2006104627 A1 | 10/2006 |
| WO | 2007081147 A1 | 7/2007 |
| WO | 2007082534 A1 | 7/2007 |
| WO | 2008008142 A2 | 1/2008 |
| WO | 2010030056 A1 | 3/2010 |
| WO | 2010056368 A1 | 5/2010 |
| WO | 2010096192 A1 | 8/2010 |

OTHER PUBLICATIONS

Office Action from Taiwan Application No. 102101177, dated Dec. 17, 2014.

Notice of Allowance from U.S. Appl. No. 14/220,023, dated Jan. 30, 2015.

Notice of Allowance from U.S. Appl. No. 14/220,029, dated Feb. 11, 2015.

International Search Report and Written Opinion from International Application No. PCT/US2013/021336, dated May 23, 2013.

Non-Final Office Action from U.S. Appl. No. 13/740,127, dated Oct. 27, 2014.

Notice of Allowance from U.S. Appl. No. 13/740,131, dated Oct. 27, 2014.

(56) References Cited

OTHER PUBLICATIONS

Final Office Action from U.S. Appl. No. 13/740,134, dated Mar. 3, 2015.
Non-Final Office Action from U.S. Appl. No. 13/740,134, dated Oct. 10, 2014.
Non-Final Office Action from U.S. Appl. No. 13/740,138, dated Dec. 1, 2014.
Notice of Allowance from U.S. Appl. No. 13/740,139, dated Aug. 29, 2014.
Notice of Allowance from U.S. Appl. No. 13/740,145, dated Mar. 30, 2015.
Non-Final Office Action from U.S. Appl. No. 13/740,145, dated Sep. 29, 2014.
Notice of Allowance from Taiwan Patent Application No. 102101177, dated Apr. 24, 2015.
Notice of Allowance from U.S. Appl. No. 13/740,138, dated Jun. 5, 2015.
Notice of Allowance from U.S. Appl. No. 13/740,127, dated Jun. 8, 2015.
Notice of Allowance from U.S. Appl. No. 14/569,375, dated Apr. 15, 2015.
Notice of Allowance from U.S. Appl. No. 13/740,134, dated May 29, 2015.
Notice of Allowability from U.S. Appl. No. 13/740,145, dated May 26, 2015.
Corrected Notice of Allowability from U.S. Appl. No. 13/740,138, dated Jul. 8, 2018.
Non-Final Office Action from U.S. Appl. No. 13/740,127, dated Feb. 23, 2015.
Final Office Action from U.S. Appl. No. 13/740,134, dated Mar. 3, 3015.
Notice of Allowance from U.S. Appl. No. 14/804,276, dated Oct. 21, 2015.
Extended Europrean Search Report from European Application No. 13738301.4, dated Nov. 17, 2015.
Notice of Allowance from U.S. Appl. No. 13/740,145, dated Jan. 15, 2016.
Office Action from Taiwan Patent Application No. 102101177, dated Dec. 17, 2014.
Non-Final Office Action from U.S. Appl. No. 13/740,141, dated Oct. 16, 2015.
Notice of Allowance from U.S. Appl. No. 13/740,145, dated Sep. 8, 2015.
Notice of Allowance from U.S. Appl. No. 14/334,558, dated Sep. 10, 2014.
Notice of Allowance from U.S. Appl. No. 13/740,123, dated Jul. 10, 2014.
INTSIG Information Co., Ltd., "CamScanner," www.intsig.com/en/camscanner.html, retrieved Oct. 25, 2012.
INTSIG Information Co., Ltd., "Product Descriptions," www.intsig.com/en/product.html, retrieved Oct. 25, 2012.
Extended European Search Report from European Application No. 14775259.6, dated Jun. 1, 2016.
Non-Final Office Action from U.S. Appl. No. 13/898,407, dated Aug. 1, 2013.
Final Office Action from U.S. Appl. No. 13/898,407, dated Jan. 13, 2014.
Notice of Allowance from U.S. Appl. No. 13/898,407, dated Apr. 23, 2014.
Non-Final Office Action from U.S. Appl. No. 14/340,460, dated Jan. 16, 2015.
Notice of Allowance from U.S. Appl. No. 14/340,460, dated Apr. 28, 2015.
Non-Final Office Action from U.S. Appl. No. 14/814,455, dated Jun. 17, 2016.
Final Office Action from U.S. Appl. No. 13/740,141, dated May 5, 2016.
Thrasher, C. W. et al., U.S. Appl. No. 15/214,351, filed Jul. 19, 2016.
Notice of Allowance from U.S. Appl. No. 13/740,141, dated Jul. 29, 2016.
Non-Final Office Action from U.S. Appl. No. 14/818,196, dated Aug. 19, 2016.
International Search Report and Written Opinion from International Application No. PCT/US2016/043207, dated Oct. 21, 2016.
Final Office Action from U.S. Appl. No. 14/814,455, dated Dec. 16, 2016.
International Search Report and Written Opinion from International Application No. PCT/US14/26569, dated Aug. 12, 2014.
Gllavata et al., "Finding Text in Images via Local Thresholding," International Symposium on Signal Processing and Information Technology, Dec. 2003, pp. 539-542.
Zunino et al., "Vector Quantization for License-Plate Location and Image Coding," IEEE Transactions on Industrial Electronics, vol. 47, Issue 1, Feb. 2000, pp. 159-167.
International Search Report and Written Opinion from International Application No. PCT/US2014/057065, dated Dec. 30, 2014.
Non-Final Office Action from U.S. Appl. No. 14/932,902, dated Sep. 28, 2016.
Su et al., "Stereo rectification of calibrated image pairs based on geometric transformation," I.J.Modern Education and Computer Science, vol. 4, 2011, pp. 17-24.
Malis et al., "Deeper understanding of the homography decomposition for vision-based control," [Research Report] RR-6303, INRIA, Sep. 2007, pp. 1-90.
Notice of Allowance from U.S. Appl. No. 14/491,901, dated Aug. 4, 2015.
Final Office Action from U.S. Appl. No. 14/491,901, dated Apr. 30, 2015.
Non-Final Office Action from U.S. Appl. No. 14/491,901, dated Nov. 19, 2014.
Non-Final Office Action from U.S. Appl. No. 15/234,969, dated Nov. 18, 2016.
Amtrup, J. W. et al., U.S. Appl. No. 14/220,029, filed Mar. 19, 2014.
International Search Report and Written Opinion from PCT Application No. PCT/US15/26022, dated Jul. 22, 2015.
Non-Final Office Action from U.S. Appl. No. 14/588,147, dated Jun. 3, 2015.
Notice of Allowance from Japanese Patent Application No. 2014-005616, dated Jun. 12, 2015.
Office Action from Japanese Patent Application No. 2014-005616, dated Oct. 7, 2014.
Final Office Action from U.S. Appl. No. 14/588,147, dated Nov. 4, 2015.
Non-Final Office Action from U.S. Appl. No. 14/283,156, dated Dec. 1, 2015.
Notice of Allowance from U.S. Appl. No. 14/588,147, dated Jan. 14, 2016.
Non-Final Office Action from U.S. Appl. No. 14/804,278, dated Mar. 10, 2016.
Notice of Allowance from U.S. Appl. No. 14/283,156, dated Mar. 16, 2016.
Summons to Attend Oral Proceedings from European Application No. 10741580.4, dated Jun. 7, 2016.
Notice of Allowance from U.S. Appl. No. 14/078,402, dated Feb. 26, 2014.
Non-Final Office Action from U.S. Appl. No. 14/078,402, dated Jan. 30, 2014.
Notice of Allowance from U.S. Appl. No. 14/175,999, dated Aug. 8, 2014.
Non-Final Office Action from U.S. Appl. No. 14/175,999, dated Apr. 3, 2014.
Notice of Allowance from U.S. Appl. No. 13/802,226, dated Jan. 29, 2016.
Non-Final Office Action from U.S. Appl. No. 13/802,226, dated Sep. 30, 2015.
Final Office Action from U.S. Appl. No. 13/802,226, dated May 20, 2015.
Non-Final Office Action from U.S. Appl. No. 13/802,226, dated Jan. 8, 2015.
Non-Final Office Action from U.S. Appl. No. 14/209,825, dated Apr. 14, 2015.

(56) References Cited

OTHER PUBLICATIONS

Final Office Action from U.S. Appl. No. 14/209,825, dated Aug. 13, 2015.
Notice of Allowance from U.S. Appl. No. 14/209,825, dated Oct. 28, 2015.
International Search Report and Written Opinion from International Application No. PCT/US2014/026569, dated Aug. 12, 2014.
Gllavata, et al., "Finding Text in Images via Local Thresholding," International Symposium on Signal Processing and Information Technology, Dec. 2003, pp. 539-542.
Zunino, et al. "Vector Quantization for License-Plate Location and Image Coding," IEEE Transactions on Industrial Electronics, vol. 47, Issue 1, Feb. 2000, pp. 159-167.
Bruns, E. et al., "Mobile Phone-Enabled Museum Guidance with Adaptive Classification," Computer Graphics and Applications, IEEE, vol. 28, No. 4, Jul.-Aug. 2008, pp. 98,102.
Tzotsos, A. et al., "Support vector machine classification for object-based image analysis," Object-Based Image Analysis, Springer Berlin Heidelberg, 2008, pp. 663-677.
Vailaya, A. et al., "On Image Classification: City Images vs. Landscapes," Pattern Recognition, vol. 31, No. 12, Dec. 1998, pp. 1921-1935.
Extended European Search Report from European Application No. 14773721.7, dated May 17, 2016.
Gonzalez, R. C. et al., "Image Interpolation", Digital Image Processing, Third Edition,2008, Chapter 2, pp. 65-68.
Kim, D. et al., "Location-based large-scale landmark image recognition scheme for mobile devices," 2012 Third FTRA International Conference on Mobile, Ubiquitous, and Intelligent Computing, IEEE, 2012, pp. 47-52.
Sauvola, J. et al., "Adaptive document image binarization," Pattern Recognition, vol. 33, 2000, pp. 225-236.
Tsai, C., "Effects of 2-D Preprocessing on Feature Extraction: Accentuating Features by Decimation, Contrast Enhancement, Filtering," EE 262: 2D Imaging Project Report, 2008, pp. 1-9.
Final Office Action from U.S. Appl. No. 14/804,278, dated Jun. 28, 2016.
International Search Report and Written Opinion from International Application No. PCT/US2014/065831, dated Feb. 26, 2015.
U.S. Appl. No. 61/780,747, filed Mar. 13, 2013.
U.S. Appl. No. 61/819,463, dated May 3, 2013.
Notice of Allowance from U.S. Appl. No. 14/268,876, dated Aug. 29, 2014.
Non-Final Office Action from U.S. Appl. No. 14/268,876, dated Jul. 24, 2014.
Non-Final Office Action from U.S. Appl. No. 14/473,950, dated Jan. 21, 2015.
Non-Final Office Action from U.S. Appl. No. 14/473,950, dated Feb. 6, 2015.
Final Office Action from U.S. Appl. No. 14/473,950, dated Jun. 26, 2015.
Notice of Allowance from U.S. Appl. No. 14/473,950, dated Sep. 16, 2015.
Non-Final Office Action from U.S. Appl. No. 14/981,759, dated Jun. 7, 2016.
Extended European Search Report from European Application No. 14861942.2, dated Nov. 2, 2016.
Non-Final Office Action from U.S. Appl. No. 15/191,442, dated Oct. 12, 2016.
Partial Supplementary European Search Report from European Application No. 14792188.6, dated Sep. 12, 2016.
Notice of Allowance from U.S. Appl. No. 14/981,759, dated Nov. 16, 2016.
Non-Final Office Action from U.S. Appl. No. 13/740,127, dated Ferury 23, 2015.
International Search Report and Written Opinion from International Application No. PCT/US2015/021597, dated Jun. 22, 2015.
U.S. Appl. No. 14/340,460, filed Jul. 24, 2014.
Requirement for Restriction from U.S. Appl. No. 14/177,136, dated Aug. 15, 2014.

International Search Report and Written Opinion from PCT Application No. PCT/US2014/036673, dated Aug. 28, 2014.
U.S. Appl. No. 14/473,950, filed Aug. 29, 2014.
Final Office Action from U.S. Appl. No. 14/176,006, dated Sep. 3, 2014.
Bishop, C.M., "Neural Networks for Pattern Recognition," Oxford University Press, Inc., 1995, p. 27.
Bishop, C.M., "Neural Networks for Pattern Recognition," Oxford University Press, Inc., 1995, pp. 77-85.
Bishop, C.M., "Neural Networks for Pattern Recognition," Oxford University Press, Inc., 1995, pp. 230-247.
Bishop, C.M., "Neural Networks for Pattern Recognition," Oxford University Press, Inc., 1995, pp. 295-300.
Bishop, C.M., "Neural Networks for Pattern Recognition," Oxford University Press, Inc., 1995, pp. 343-345.
Final Office Action from U.S. Appl. No. 14/220,023, dated Sep. 18, 2014.
International Search Report and Written Opinion from PCT Application No. PCT/US14/26597, dated Sep. 19, 2014.
U.S. Appl. No. 14/491,901, filed Sep. 19, 2014.
Final Office Action from U.S. Appl. No. 14/220,029, dated Sep. 26, 2014.
International Search Report and Written Opinion from PCT Application No. PCT/US14/36851, dated Sep. 25, 2014.
Notice of Allowance from U.S. Appl. No. 14/176,006, dated Oct. 1, 2014.
Non-Final Office Action from U.S. Appl. No. 11/752,691, dated Oct. 10, 2014.
Non-Final Office Action from U.S. Appl. No. 15/146,848, dated Dec. 6, 2016.
U.S. Appl. No. 15/389,342, filed Dec. 22, 2016.
U.S. Appl. No. 15/390,321, filed Dec. 23, 2016.
Final Office Action from U.S. Appl. No. 14/177,136, dated Nov. 4, 2016.
Non-Final Office Action from U.S. Appl. No. 14/177,136, dated Apr. 13, 2016.
Non-Final Office Action from U.S. Appl. No. 14/177,136, dated Dec. 29, 2014.
"Location and Camera with Cell Phones," Wikipedia, Mar. 30, 2016, pp. 1-19.
Non-Final Office Action from U.S. Appl. No. 14/176,006, dated Apr. 7, 2014.
Non-Final Office Action from U.S. Appl. No. 14/220,023, dated May 5, 2014.
Non-Final Office Action from U.S. Appl. No. 14/220,029, dated May 14, 2014.
International Search Report and Written Opinion from International Application No. PCT/US2016/043204, dated Oct. 6, 2016.
Final Office Action from U.S. Appl. No. 14/818,196, dated Jan. 9, 2017.
Decision to Refuse from European Application No. 10 741 580.4, dated Jan. 20, 2017.
Rainardi, V., "Building a Data Warehouse: With Examples in SQL Server," Apress, Dec. 27, 2007, pp. 471-473.
Office Action from Japanese Patent Application No. 2015-229466, dated Nov. 29, 2016.
Extended European Search Report from European Application No. 14792188.6, dated Jan. 25, 2017.
Non-Final Office Action from U.S. Appl. No. 15/394,719, dated Feb. 21, 2017.
Non-Final Office Action from U.S. Appl. No. 15/389,342, dated Mar. 10, 2017.
Notice of Allowance from U.S. Appl. No. 14/818,196, dated Mar. 16, 2017.
Office Action from Chinese Patent Application No. 201380004057.2, dated Feb. 27, 2017.
Notice of Allowance from U.S. Appl. No. 14/814,455, dated Mar. 30, 2017.
Non-Final Office Action from U.S. Appl. No. 14/932,902, dated Apr. 11, 2017.
Non-Final Office Action from U.S. Appl. No. 15/390,321, dated Mar. 17, 2017.

(56) References Cited

OTHER PUBLICATIONS

Notice of Allowance from U.S. Appl. No. 15/146,848, dated Apr. 13, 2017.
Notice of Allowance from U.S. Appl. No. 15/394,719, dated Jun. 20, 2017.
International Search Report and Written Opinion from International Application No. PCT/US2017/025553, dated May 24, 2017.
Office Action from Chinese Patent Application No. 201580014141.1, dated May 31, 2017.
Extended European Search Report from European Application No. 14881675.4, dated Jun. 7, 2017.
Notice of Allowance from U.S. Appl. No. 15/191,442, dated Apr. 24, 2017.
Notice of Allowance from U.S. Appl. No. 15/234,969, dated May 8, 2017.
Notice of Allowance from U.S. Appl. No. 14/814,455, dated May 26, 2017.
Corrected Notice of Allowance from U.S. Appl. No. 15/191,442, dated May 26, 2017.

* cited by examiner

MOBILE DOCUMENT DETECTION AND ORIENTATION BASED ON REFERENCE OBJECT CHARACTERISTICS

RELATED APPLICATIONS

This application claims priority to U.S. Provisional Patent Application No. 62/072,968, filed Oct. 30, 2014, the contents of which are herein incorporated by reference.

RELATED APPLICATIONS

This application is related to U.S. Pat. No. 8,855,375 (U.S. patent application Ser. No. 13/740,123, filed Jan. 11, 2013) and U.S. Pat. No. 8,885,229 (U.S. patent application Ser. No. 14/268,876, filed May 2, 2014), which are herein incorporated by reference.

FIELD OF INVENTION

The present invention relates to image capture and image processing, more particularly to capturing and processing digital images using a mobile device, and even more particularly to capturing and processing digital images of financial documents, especially checks, and identification documents (IDs), especially government-issued IDs, using a mobile device.

BACKGROUND OF THE INVENTION

In the increasingly mobile modern economy, it becomes more and more important for users to be capable of performing various activities traditionally requiring physical documents via mobile devices. For example, processing payments memorialized on financial documents, and authenticating one's identity using an ID.

Accordingly, digital images of a document such as a letter, a check, a bill, an invoice, etc., may be captured using the camera of a mobile device, and processed on-device or uploaded to a backend server for processing. Many such image capture and processing algorithms have been developed, but conventional image capture and processing algorithms fail to reliably detect document edges within the image, especially when the document background and/or image background are similar in texture, color, etc. and/or complex, such as is common for many check backgrounds depicting e.g. a scenic photograph, or IDs depicting a complex hologram, seal, photograph, etc.

In addition, even where document edges may be detected properly, it is a particular challenge to ensure an image of the document is properly oriented for subsequent processing. Since many documents are rectangular in shape, the position of the document edges cannot be consistently relied upon to distinguish alternative vertical orientations, particularly upside down from right-side up. Accordingly, document geometry is not suitable for reliable orientation of a document exhibiting a particular skew angle in a captured image.

In view of the foregoing problems with conventional approaches to mobile image capture and processing, it would be advantageous to provide techniques that improve upon the conventional approach both with respect to accuracy and fidelity of document edge detection and document orientation. Even more advantageous would be improved techniques that simultaneously improve the performance of the mobile device as an image processing platform by reducing computational cost associated with achieving high quality processed images.

SUMMARY OF THE INVENTION

In one embodiment, a computer-implemented method for processing a digital image depicting a document includes analyzing the digital image to determine one or more of a presence and a location of one or more reference objects; determining one or more geometric characteristics of at least one of the reference objects; defining one or more region(s) of interest based at least in part on one or more of the determined geometric characteristics; and detecting a presence or an absence of an edge of the document within each defined region of interest.

In another embodiment, a computer-implemented method is for processing a plurality of digital image frames, where each frame includes at least a partial digital representation of a document. The method includes: analyzing a first frame among the plurality of frames to determine one or more of a presence and a location of one or more reference objects within the first frame; determining one or more geometric characteristics of at least one reference object within the first frame; defining one or more region(s) of interest based at least in part on one or more of the determined geometric characteristics of the at least one reference object within the first frame; defining one or more subregion(s) of interest within a second frame; and detecting a presence or an absence of an edge of the document within each defined subregion of interest. Each subregion of interest is defined based at least in part on: one or more geometric characteristics of at least one of the region(s) of interest within which the subregion of interest was defined; and one or more of the determined geometric characteristics of the reference object(s) within the first frame.

In yet another embodiment, a computer-implemented method for processing a digital image including a digital representation of a document involves: determining the document corresponds to one of a predefined set of document types; analyzing the digital image to determine one or more of a presence and a location of one or more reference objects; determining one or more geometric characteristics of at least one of the reference objects; and extrapolating a location of one or more edges of the document within the digital image based at least in part on the determined document type and the one or more geometric characteristics.

In still yet another embodiment, a computer program product includes a computer readable storage medium having embodied thereon computer readable instructions configured to cause a processor of a mobile device, upon execution, to: perform any of the foregoing methods.

In even more embodiments, a system includes a memory and/or a processor configured to execute logic, the logic being configured to cause a processor of a mobile device, upon execution, to perform any of the foregoing methods.

Of course, the foregoing embodiments are to be understood as merely exemplary illustrations of the presently disclosed inventive concepts. Additional embodiments, features, functions, and advantages will become apparent from reviewing the disclosures in conjunction with the Figures presented herewith.

DETAILED DESCRIPTION

Figure 1:
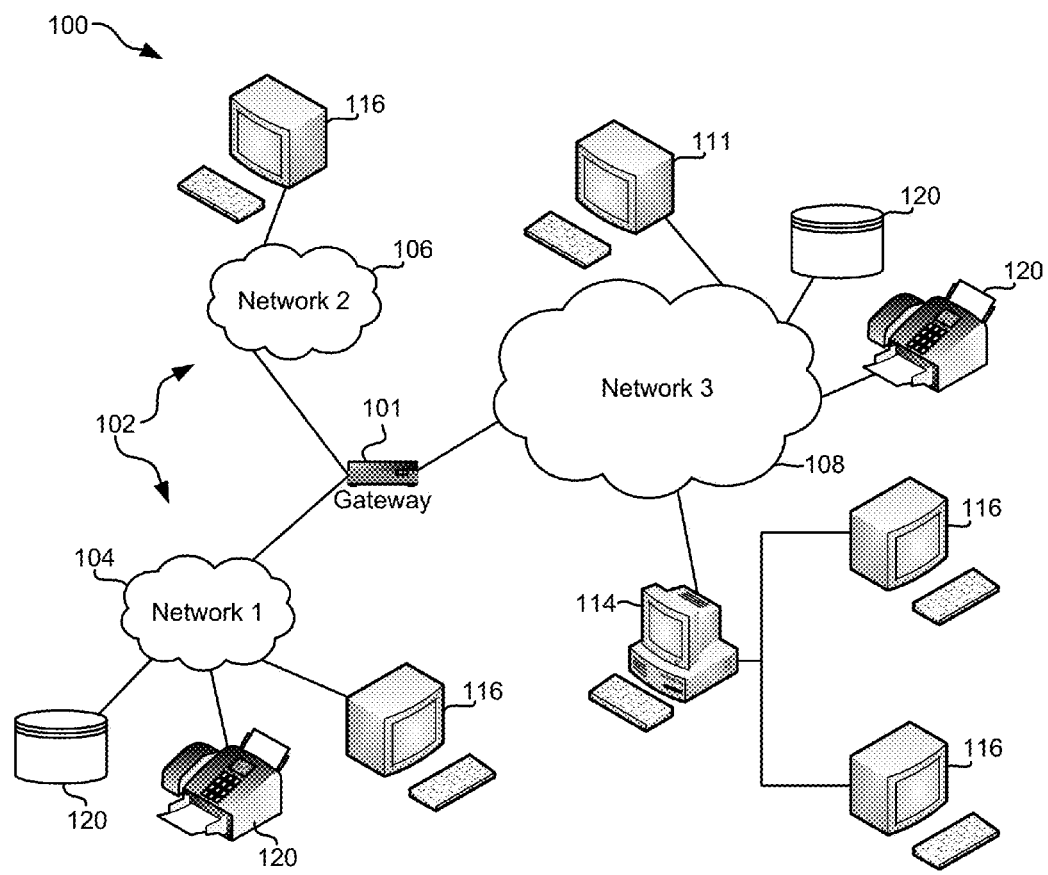
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

General Embodiments

In one general embodiment, a computer-implemented method for processing a digital image depicting a document includes analyzing the digital image to determine one or more of a presence and a location of one or more reference objects; determining one or more geometric characteristics of at least one of the reference objects; defining one or more region(s) of interest based at least in part on one or more of the determined geometric characteristics; and detecting a presence or an absence of an edge of the document within each defined region of interest.

In another general embodiment, a computer-implemented method is for processing a plurality of digital image frames, where each frame includes at least a partial digital representation of a document. The method includes: analyzing a first frame among the plurality of frames to determine one or more of a presence and a location of one or more reference objects within the first frame; determining one or more geometric characteristics of at least one reference object within the first frame; defining one or more region(s) of interest based at least in part on one or more of the determined geometric characteristics of the at least one reference object within the first frame; defining one or more subregion(s) of interest within a second frame; and detecting a presence or an absence of an edge of the document within each defined subregion of interest. Each subregion of interest is defined based at least in part on: one or more geometric characteristics of at least one of the region(s) of interest within which the subregion of interest was defined; and one or more of the determined geometric characteristics of the reference object(s) within the first frame.

In yet another general embodiment, a computer-implemented method for processing a digital image including a digital representation of a document involves: determining the document corresponds to one of a predefined set of document types; analyzing the digital image to determine one or more of a presence and a location of one or more reference objects; determining one or more geometric characteristics of at least one of the reference objects; and extrapolating a location of one or more edges of the document within the digital image based at least in part on the determined document type and the one or more geometric characteristics.

The presently disclosed inventive concepts are broadly applicable to processing any type of image depicting a document, and are particularly applicable to processing images depicting a document having represented thereon a plurality of reference objects such as text characters by which information regarding the size and position of the document within the image may be determined in whole or in part. In especially preferred approaches, the image depicts a document having represented thereon a plurality of characters depicted in a standard font. Magnetic Ink Recognition Characters (MICR) and Machine Readable Zone (MRZ) characters are most preferred.

Accordingly, the presently disclosed inventive embodiments are particularly useful in applications involving processing images of identity documents (IDs), financial documents such as checks, credit cards, bill statements, invoices, etc. as would be understood by one having ordinary skill in the art upon reading the present descriptions.

The present descriptions relate to, and are in the field of mobile device-mediated image capture and processing of identity documents for integration with business workflows. As understood herein, the term "identity document" or "ID" should be understood to include any type of document that may be presented for purposes of proving, authenticating, or verifying all or part of an entity's identity. The ID includes one or more types of identifying information, which generally vary according to the type of ID and the type of entity to which the ID corresponds, but various types of IDs may depict one or more common types of identifying information.

Exemplary forms of ID as contemplated herein should be understood to include, but not be limited to, government-issued IDs such as passports, military IDs, tax IDs, Social Security cards, birth certificates (where issued by government agency), licenses or permits such as a hunting license, professional license, driver's license, etc. in one embodiment.

IDs may also include employer-issued IDs such as employee IDs, security documents or badges, payroll documents, benefits documents, certifications, etc., in more embodiments.

IDs may still further include financial documents such as insurance policies, cards, and other associated insurance documents, documents depicting financial account information, such as account statements, tender documents associated with financial accounts such as checks, credit cards, debit cards, etc.

In another embodiment, IDs may additionally and/or alternatively include medical documents, such as a physician's chart, a prescription, a medical profile or evaluation, a genetic sequence or profile or other document containing genetic information, etc. as would be understood by one having ordinary skill in the art upon reading the present descriptions.

In at least some approaches, an ID may identify multiple entities, human and/or non-human. For example, in the case of a medical document, a prescription may be considered to identify at least two human entities (the patient, the prescribing physician, and/or dispensing pharmacist) and at least two non-human entities (the drug, and the pharmacy dispensing the drug). In various embodiments, the ID may therefore be considered to correspond to any number of these entities, usually for different purposes relating to the entity or entities the ID is considered to correspond to in the particular context at hand. In another example, an insurance document may be considered to correspond to at least one human entity (the policyholder, insured driver (e.g. if not the primary or named policyholder)) and at least one nonhuman entity (the vehicle, e.g. via a VIN, license plate number, make/model/year, etc.).

In still more embodiments, IDs may additionally and/or alternatively comprise a photograph, e.g. a photograph of an individual or an individual's face, which may be utilized singly or in unison with other identifying information and/or IDs. Preferably, the photograph and the other ID(s) depict a same or similar photographic image of the individual to which the IDs correspond, such as a driver's license and a facial photograph captured using a mobile device.

In various approaches, IDs may include any other type of document depicting identifying information, as would be understood by one having ordinary skill in the art upon reading the present descriptions.

Moreover, IDs need not necessarily be embodied as physical documents, although physically embodied IDs are preferred. In some approaches IDs may exist in the form of electronic records depicting the identifying information, or image data depicting the ID or identifying information.

In several approaches, IDs may include a single document or a plurality of documents. Each ID may also include a plurality of pages per document, e.g. a "front" and "back" side of an ID such as a driver's license, credit card, etc.; multiple pages of a passport, medical record, credit report, etc. as would be understood by one having ordinary skill in the art upon reading the present descriptions. In embodiments where multiple-paged documents depict similar or redundant information, the information identified from each page of the document may be utilized as a validation tool to determine accuracy of data extracted from each respective page, as would be understood by one having ordinary skill in the art upon reading the present descriptions.

Regardless of the particular type of document, the presently disclosed inventive concepts involve the use of reference objects such as MICR characters, MRZ characters, etc. and a priori knowledge regarding the reference objects themselves, and about the reference objects with respect to the document as a whole, to facilitate accurate and consistent detection of document edges within image data.

Although the following descriptions are given with reference to an exemplary scenario involving detecting a check based on MICR reference objects, it should be understood that the following concepts are equally applicable to any type of document and may utilize any type of reference object consistent with the definitions provided herein without departing from the scope of the present disclosures.

Additionally, the techniques applicable to a particular type of document, reference object, etc. may be used in conjunction to facilitate document detection, e.g. in images depicting multiple documents, images depicting a document with multiple types of reference object, etc. as would be understood by a person having ordinary skill in the art upon reading the present disclosure.

Figure 7:
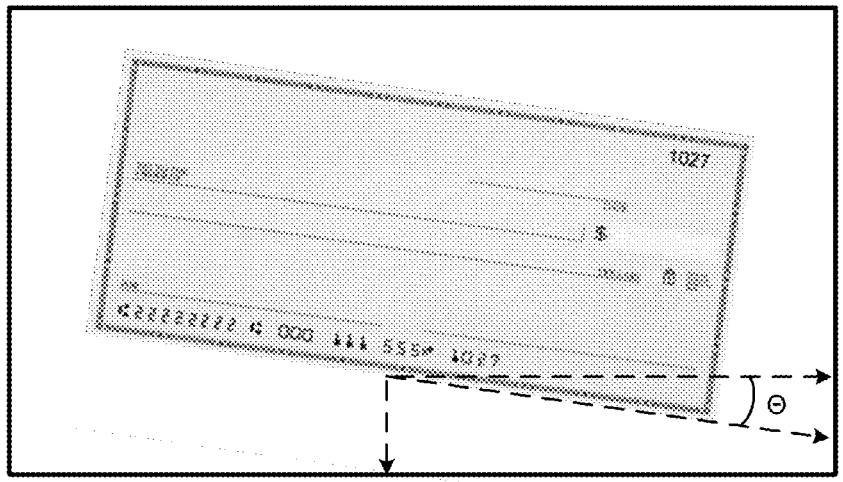
FIG. 7 is an image showing a digital representation of a check exhibiting a skew angle, according to one embodiment.

A first implementation may assume the document is parallel to the edges of the view, and search for edges in the outside areas of the image, and define a boundary between the check and the background based on the search. Other implementations may not rely on this assumption, and may take into account a skew angle of the document (e.g. skew angle θ as shown in FIG. 7).

Accordingly, in approaches where the image is one or more still images, it has been found advantageous to find the boundaries of a document such as a check front, by first finding the MICR line and then looking for document boundary edges in likely places. In video, several implementations have been discovered to provide advantageous benefits in the context of detecting document edges in images. Likely places for document edges may be determined by leveraging a priori knowledge about the reference objects and the location of the reference objects on the physical document, in preferred implementations.

A priori knowledge useful for facilitating document edge detection may include any geometric characteristics of the reference characters and/or the document, such as shape, width, height, aspect ratio, area, etc. as well as statistical descriptions of such measures, such as mean height, width, character spacing, etc. as would be understood by a person having ordinary skill in the art upon reading the present descriptions. In embodiments where a plurality of reference objects are known to be present, as well as where the plurality of reference objects appear in a particular pattern, such as a string of characters, the number and/or type of characters that may be present in the pattern may be useful a priori knowledge to leverage for detection of edges.

A priori knowledge may also include positional information, such as knowledge regarding the location of reference object(s) on the physical document. Particularly useful positional information, in one embodiment, includes knowledge regarding the distance between one or more reference objects and a region of interest of and/or within the document. For instance, a distance between a reference object edge and a document edge is especially useful, in various embodiments. More preferred are positional information known with respect to a plurality of reference objects, such as a distance between a top or bottom edge of a plurality of reference objects arranged substantially in a line and a top or bottom edge of the document. Similarly, side edges may be useful if location is known with respect to left and/or right side edges of the document.

In another implementation, reference object line information (as discussed in further detail below with respect to detecting document edges in still, single images) may additionally be utilized to detect boundaries. For instance, expected geometric characteristics of the reference objects individually and/or as a whole may be utilized, in addition to positional information regarding the reference objects. This particular implementation provides an advantageous combination of accuracy/fidelity (i.e. consistently and properly identify check edges) along with sufficiently low computational cost to permit the technique to be applied to video data, although slightly less accurate and precise than the "pure" single, still image approach described further below.

As such, the presently disclosed inventive concepts improve the functioning of mobile devices as image processing platforms by enabling document edge detection in video data, permitting applications in which a single, high quality image may be captured on-the-fly from the video feed. This also enables live feedback be provided to a user holding the mobile device, such feedback being designed to improve the quality of image data received by the mobile device and facilitating capture under suitable conditions for downstream processing.

In yet another embodiment, the boundary detection techniques are based on the geometry information from a line of reference objects appearing in the document. Based in whole or in part on a priori knowledge regarding documents, e.g. the location of part(s) or all of a reference object line (preferably in relation to other features/elements of the document, such as an edge, signature line, account number, routing number, check number, amount box, etc.), global document geometry, document type, etc., the boundary detection techniques are may hypothesize and in some cases precisely calculate where the boundaries are located within the image. In preferred implementations, this hypothesis or calculated position may be determined without even actively attempting to determine the boundary locations by processing the image data. This approach, in turn, allows reconciliation of "found" edges (which may include false positives and/or false negatives) with the hypothesized edge(s) and/or edge location(s). This is particularly advantageous in cases where only part of a document was in the view, in which case it is useful to leverage a priori knowledge that the found edges are surely erroneous.

With reference specifically to document type and document geometry, it is noted that the geometry of a check depends on its source. A personal check is normally 6 inches wide×2.75 inches in height, whereas a business check is usually wider (and sometimes taller). Of course, other documents may have known dimensions, such as driver's licenses, passports, business documents, etc. as would be understood by a person having ordinary skill in the art upon reading the present descriptions.

Using this knowledge in conjunction with characteristics of the reference objects (e.g. MICR line, one or more MRZ lines, etc.) it is possible to hypothesize the kind of document appearing in the image. For instance, it is desirable and advantageous to utilize the different geometries to indicate putative boundaries or "regions of interest" based on this. In particularly preferred approaches, it is possible to use the presence of certain MICR and or MRZ characters, and/or a threshold on the length of the MICR or MRZ line(s), for this purpose. For instance, in some documents a standard number of characters may be expected for a particular string of reference objects, such as for an account number or routing number of a check, a MRZ line on a passport or driver's license, etc. as would be understood by one having ordinary skill in the art upon reading the present descriptions.

Based on the boundaries detected, it is advantageous in some embodiments, e.g. where a user is actively capturing image data depicting the document, to generate guidance for the user to move the camera so that a good image of a document can be captured. Guidance includes zoom in/out, rotate left/right, move left/right, and move up/down. For example, in one embodiment, a bounding box is displayed on the mobile device. The box is depicted in a particular color, e.g. yellow, and as a user moves the device in relation to the document, the box boundaries may change color to indicate to the user that the document or an edge of the document is detected (not detected, e.g. in red; putatively, e.g. in yellow; or with certainty, e.g. in green).

Applying document detection in video allows certain advantages. If a calculation succeeds for a video frame, then it is likely that the geometrical objects that were found do not move much in the next frame that is analyzed. This allows formulation of local search constraints that increase the speed of the calculations for the next frame. For instance, if a reference object line is located in one frame, it is useful to restrict the search for the reference object line in the next frame considerably, e.g., by only looking for it in a window of 100 pixels around the line found previously.

Similarly, a successful calculation can influence other areas of calculations in the next frame. Suppose that strong left and bottom edges are detected and determined to be very good candidates for a document edge, but for some reason the techniques were not able to find the reference objects. In the next frame, it is possible to use the geometric knowledge determined previously to focus the MCIR search (and potentially use higher quality calculations to find it). This way, the video frames may function as feedback loop to independent algorithms for parts of the problem.

These optimizations can be controlled by use of other sensors as well. For instance, if the accelerometer in the phone detects a rapid movement, local search may be abandoned to avoid consuming computational resources without a significant likelihood of detecting document edges in the captured image data.

Accordingly, various embodiments of an algorithm configured to perform edge detection and/or document orientation as described herein, as well as several mobile applications configured to facilitate use of such algorithmic processing within the scope of the present disclosures are set forth in further detail below. It is to be appreciated that each section below describes functionalities that may be employed in any combination with those disclosed in other sections, including any or up to all the functionalities described herein. Moreover, functionalities of the processing algorithm embodiments as well as the mobile application embodiments may be combined and/or distributed in any manner across a variety of computing resources and/or systems, in several approaches.

For instance, and with reference to FIG. 1, FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, mobile device, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
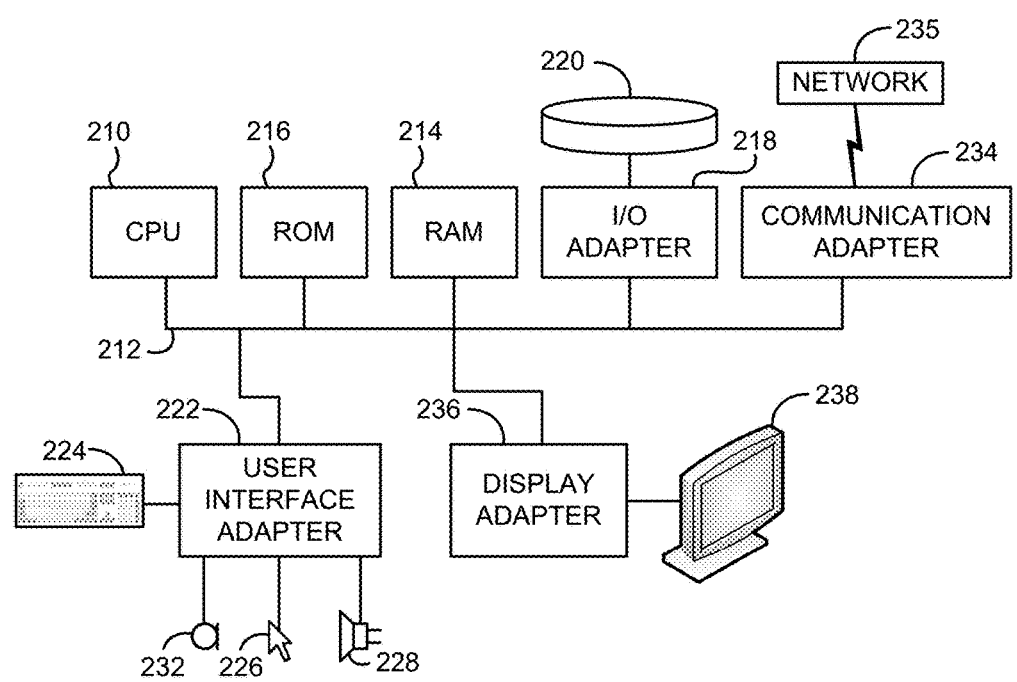
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of brevity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

Returning to the presently disclosed inventive techniques for document edge detection, an application may be installed on the mobile device, e.g., stored in a nonvolatile memory of the device. In one approach, the application includes instructions to perform processing of an image on the mobile device. In another approach, the application includes instructions to send the image to one or more non-mobile devices, e.g. a remote server such as a network server, a remote workstation, a cloud computing environment, etc. as would be understood by one having ordinary skill in the art upon reading the present descriptions. In yet another approach, the application may include instructions to decide whether to perform some or all processing on the mobile device and/or send the image to the remote site. Examples of how an image may be processed are presented in more detail below.

Document Detection

One exemplary embodiment illustrating an exemplary methodology for performing page detection will now be described with reference to FIGS. 3-12. With reference to these descriptions, it will become clear how the advantages implemented for a mobile processing algorithm as described herein handle images captured by area sensors (cameras) and compensate for the inherent difficulties presented thereby.

Finding page edges within a camera-captured image according to the present disclosures helps to accommodate important differences in the properties of images captured using mobile devices as opposed, e.g., to scanners. For example, due to projective effects the image of a rectangular document in a photograph may not appear truly rectangular, and opposite sides of the document in the image may not have the same length. Second, even the best lenses have some non-linearity resulting in straight lines within an object, e.g., straight sides of a substantially rectangular document, appearing slightly curved in the captured image of that object. Third, images captured using cameras overwhelmingly tend to introduce uneven illumination effects in the captured image. This unevenness of illumination makes even a perfectly uniform background of the surface against which a document may be placed appear in the image with varied brightness, and often with shadows, especially around the page edges if the page is not perfectly flat.

In one approach, documents may be detected using a single, still image. The single image may be captured using a mobile device camera in "picture" mode (as opposed to "video" mode), or alternatively may be captured using a mobile device camera in "video" mode, and a single frame of the captured video stream may be selectively extracted therefrom and utilized as the single, still image.

In more approaches, and optionally based in whole or in part on performing a quality control analysis on one or more of the video frames, it is advantageous to determine whether, and if so which, of the video frame(s) are particularly well-suited for subsequent document detection. For example, it may be advantageous to determine a particular frame exhibits desirable (1) clarity (e.g. as indicated by image sharpness, absence of blurred lines, a resolution of the image being above a predefined "granularity" threshold, absence of perspective distortion, absence of non-desired objects such as dust, part or all of a human hand, a toy, etc., or any other artifact that degrades or otherwise negatively influences image clarity, as would be appreciated by one having ordinary skill in the art upon reading the present descriptions), (2) sufficiently bright and/or even illumination (e.g. as indicated by gamma level(s), an image saturation measure, contrast, brightness, etc. as would be understood by one having ordinary skill in the art upon reading the present descriptions); (3) a particularly desirable color scheme or balance (e.g. as indicated by tint, hue saturation, color encoding scheme (such as RGB versus CMYK), etc. as would be understood by one having ordinary skill in the art upon reading the present descriptions); and/or any other measure of image quality, particularly measures that provide or are capable of identifying/distinguishing information relevant to a desired type of downstream/subsequent processing to which the image or frame is to be subjected.

Figure 3:
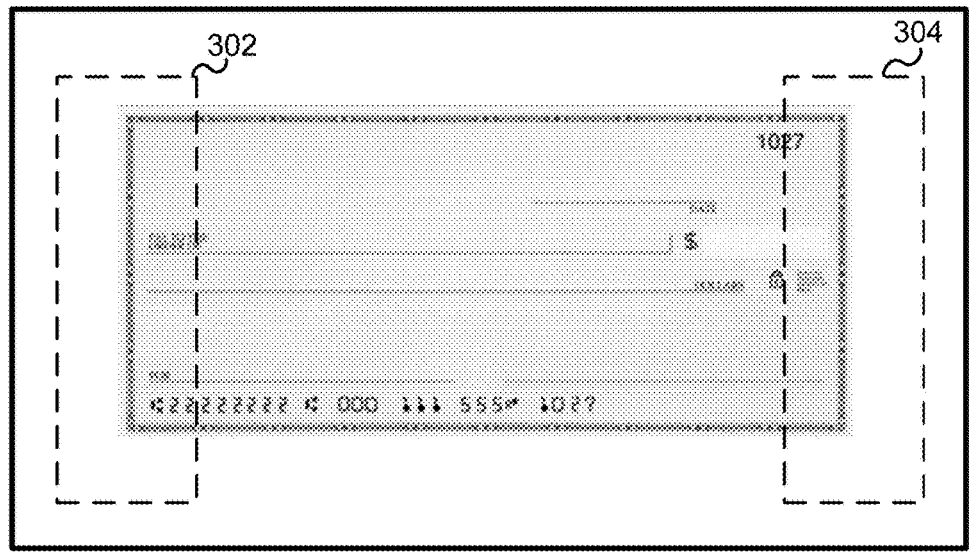
FIG. 3 is an image showing a digital representation of a check, depicting left and right (vertical) "regions of interest," according to one embodiment.

In one embodiment, the shape of a document such as a check is a rectangle in 2D space as shown in FIG. 3. Preferably, 3D projective distortions of document shapes existing in pictures taken from different angles are ignored. When the document sides as shown in FIG. 3 are aligned so as to be substantially vertical or horizontal, the image is treated as a document image without skew, i.e., the skew angle θ is zero relative to the horizontal axis.

In various approaches, a document such as the check shown in FIG. 3 can be a personal or a business document, and in the case of a check contains textual information such as dollar amount, MICR line, name and address on its front side. A check also has four sides, as shown in FIG. 3, they are left, right, top, and bottom sides respectively. The task of check detection is to locate the four sides from captured images. Of course, other documents generally following this convention of having four sides, a substantially rectangular shape, and depicting one or more reference objects may be processed according to the presently disclosed inventive concepts without departing from the scope of these disclosures.

Regions of Interest

The following descriptions provide additional details regarding the document detection process presently disclosed, and are to be understood as equally applicable to both the single, still image and video approaches outlined above. For the sake of simplicity and convenience, the following descriptions will be made with reference to a single, still image.

As one can see in FIG. 3, there is one MICR line at the bottom of the check, and the check number in the top right corner. This position information helps to determine the regions of interest which may contain check front sides.

Figure 4:
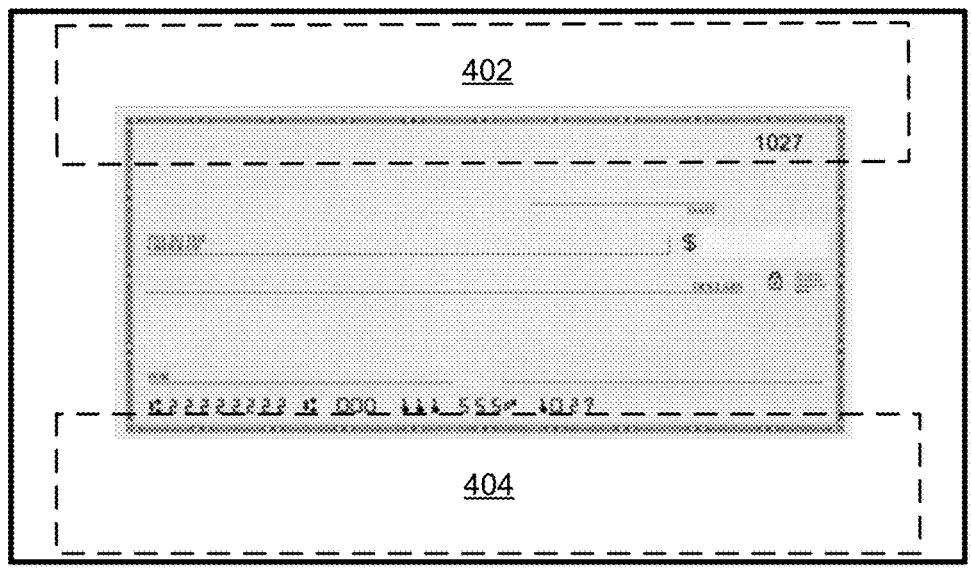
FIG. 4 is an image showing a digital representation of a check, depicting upper and lower (horizontal) "regions of interest," according to one embodiment.

The regions in the image, which may contain the check edges, are defined as regions of interest. As shown in FIG. 3, there are two regions; 302 for left check side, 304 for the right side. The FIG. 4 shows two regions 402, 404 for top and bottom edges respectively.

Figure 5:
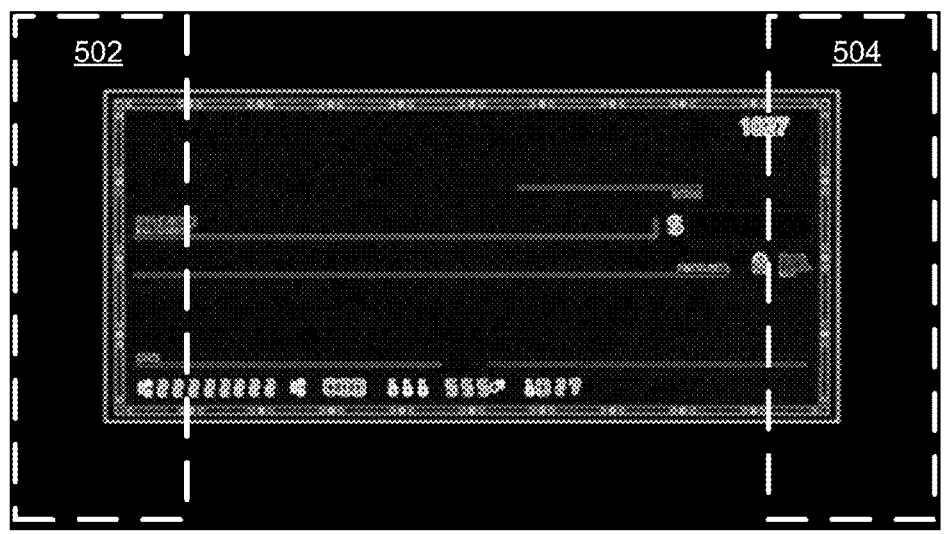
FIG. 5 is an edge image showing a digital representation of a check, depicting left and right (vertical) "regions of interest," according to one embodiment.

The edge image is extracted from the original image as shown in FIG. 3. The derived edge image is shown in FIG. 5. The edge extractor is a high-pass filter, in preferred approaches.

Figure 6:
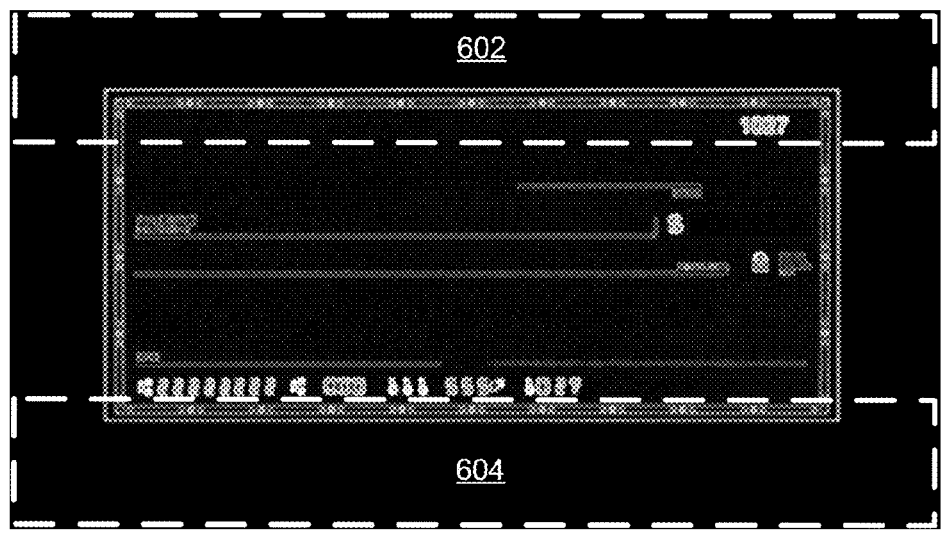
FIG. 6 is an edge image showing a digital representation of a check, depicting upper and lower (horizontal) "regions of interest," according to one embodiment.

The regions in the edge image that may contain document edges are defined as regions of interest in the edge image. As shown in FIG. 5, there are two regions; 502 for the left check side, and 504 for the right side. FIG. 6 shows two regions 602, 604 for top and bottom edges, respectively.

Each of the exemplary regions of interest as shown in FIGS. 3-6 may be defined to substantially span an entire vertical or horizontal expanse of the respective image frame, to improve likelihood of detecting document edges in the frame. Accordingly, it is possible in some approaches to simply define a lower bound (e.g. for upper regions 402, 602) of the image, above which to search for a document top edge. Similarly, an upper bound (e.g. for lower regions 404, 604) may be defined, below which the document bottom edge may be located. Corresponding right and left bounds may be defined for side regions 302, 304, 502 and 504 and searches for respective left and right document edges may be performed in the corresponding portions of the image frame.

In more embodiments, such as shown in FIGS. 7-12C, the document may be characterized by a skew angle θ, which is preferably a value as close to zero as possible, but may be a value as large as 30 degrees, in other embodiments. The aforementioned user guidance may be particularly helpful in avoiding or minimizing skew angle, in various embodiments.

Where the document is characterized by a skew angle, the regions of interest may be defined substantially as depicted in FIGS. 8-11. For instance, upper regions 902 and 1102 may be defined as a region substantially spanning the image along a diagonal corridor having a longitudinal axis substantially aligned with (e.g. parallel to) the skew angle θ. Similarly, a diagonal corridor may be defined for lower regions 904, 1104, in various approaches.

Figure 8:
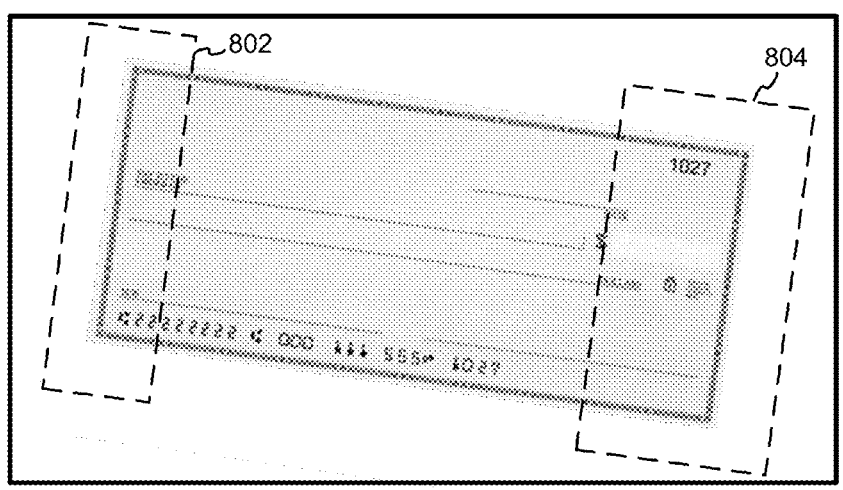
FIG. 8 is an image showing a digital representation of a check exhibiting a skew angle, depicting left and right (diagonal) "regions of interest," according to one embodiment.
Figure 9:
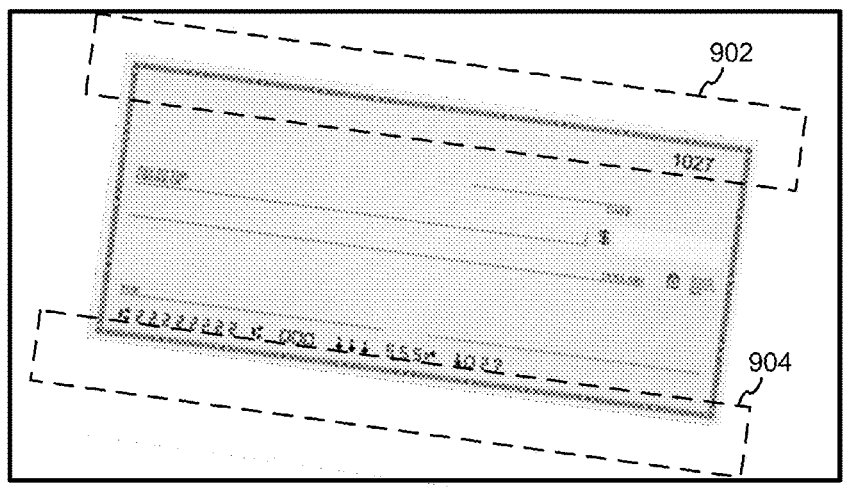
FIG. 9 is an image showing a digital representation of a check exhibiting a skew angle, depicting upper and lower (diagonal) "regions of interest," according to one embodiment.
Figure 10:
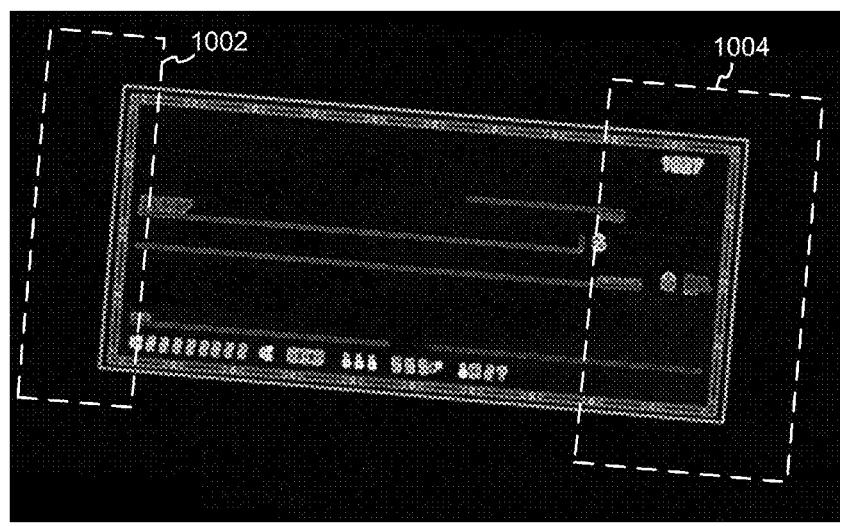
FIG. 10 is an edge image showing a digital representation of a check exhibiting a skew angle, depicting left and right (diagonal) "regions of interest," according to one embodiment.

Side regions 802, 804, 1002, and 1004 as shown in FIGS. 8 and 10 may be similarly defined, but the longitudinal axes thereof are substantially normal (i.e. perpendicular) to the longitudinal axes of the upper regions 902, 1102 and lower regions 904, 1104. Side regions are defined so as to encompass the left and right edges of the document as depicted in the image.

However, for simplicity and to provide additional computational efficiency, it is preferred to correct the skew of the document prior to performing additional processing such as edge detection and/or document orientation, in several approaches. Accordingly, it is useful to deskew the document based on detecting reference objects, as discussed in further detail below.

The four regions in the original image as shown in FIGS. 3-4, and FIGS. 7-9 are processed respectively. In order to increase the robustness of document boundary detection, brightness normalization is applied to different regions separately, in preferred embodiments.

From the edge image, e.g. as shown in FIGS. 5-6 and 10-11 it is possible to project the image vertically or horizontally to get the integral edge or histogram of edge strength signals. The location of maximum edge strength may indicate the document edge.

From document boundary estimation, it is possible to determine a bounding box surrounding the document, and preferably with sides substantially overlapping the document edges as depicted in the image. The four corners of the bounding box are estimated as the intersections of document sides.

Confidence Measures

The confidence score of the bounding box may be determined and evaluated to gain insight into the accuracy of the estimations. This confidence score, in one embodiment, is based on 1) the individual confidence scores computed for each of the four sides of the bounding box; 2) the confidence score of an estimated aspect ratio of the bounding box; 3) the color consistency confidence score; 4) the reference object line confidence score; 5) and/or the confidence of one or more characters recognized within the document bounding box, e.g. in the top right corner for a check.

In various approaches, the confidence score for each side of the bounding box is estimated based the percentage of white pixels along the side in the binary edge image. The lower the percentage, the more likely the edge is the true document edge, and the higher the confidence score.

In more embodiments, the confidence score of the aspect ratio of the estimated bounding box is defined as the ratio of the estimated aspect ratio divided by the real aspect ratio of the physical document. Importantly, in preferred approaches the ratio is calculated when the estimated aspect ratio is less than one.

Otherwise the confidence score of the aspect ratio of the estimated bounding box is defined as the ratio of the real aspect ratio divided by the estimated aspect ratio of the check.

In various embodiments, color consistency of the detected document is measured by color variations, and a confidence score assigned on this basis.

In preferred embodiments, the confidence score of reference object line and characters recognized in the document are measured by a reference object detector and textual recognition using techniques such as optical character recognition (OCR). The threshold settings for different confidences may be estimated using validation data, in various embodiments.

As mentioned previously, in some embodiments the document edges in the image may not be strictly vertical or horizontal, e.g. due to skew and/or projective effects. In order to compensate for rotation variations, the confidence scores of the four sides of the bounding box may be refined by rotating and shifting the estimated lines in the first step. This tolerates small angle deviations, such as less than five degrees in one embodiment, and increases the confidence score.

These confidence scores are particularly useful in evaluating the likelihood of having detected a document in image data, and therefore are particularly advantageous in the context of video data. For instance, when the confidence scores of the detected document bounding box are higher than pre-defined thresholds, the bounding box is considered to be the document bounding box. In addition, it is useful to evaluate the color consistency of the check image in the bounding box, particularly in embodiments where a rear face of a document is being evaluated, and especially where the document is a check. If the color variation in the detected image is larger than a threshold, the detected image will be rejected. Otherwise, a still image may be captured, and/or the frame(s) of video data depicting the detected image may be passed to another function for further processing, e.g. for extracting information from the detected document.

In addition to the confidence scores of the bounding box described above, there are confidence scores for the reference objects and the textual information depicted on the document, e.g. MICR characters and a check number as depicted on the front of a check. The reference object confidence score is either estimated by a machine-reading module (e.g. a MRZ reader, MICR reader, OCR engine, etc. as would be understood by a person having ordinary skill in the art upon reading the present descriptions), or may be based on the edge strength, in alternative embodiments. In some approaches, the reference object confidence score may be based on a combination of the two.

The confidence score for the textual information depicted on the check may similarly be or be based on a confidence score for a character recognition module such as an OCR engine, in various approaches.

In a particularly preferred embodiment involving checks, the confidence score of the check number in the top right is estimated based on the location, edge strength, and recognition results from the OCR engine.

Reference Object-Based Detection and Orientation Algorithm

While the foregoing disclosures set forth the presently described inventive concepts from a general perspective and reflect the various embodiments and implementations possible by employing those inventive concepts, the following descriptions are provided to illustrate in further detail the procedure by which reference objects may be leveraged to facilitate document detection and orientation for mobile capture image processing.

Figure 11:
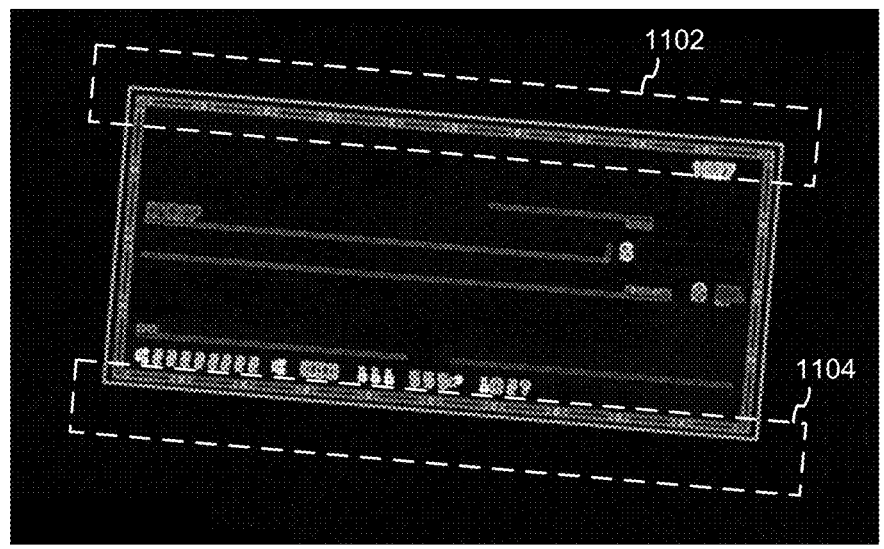
FIG. 11 is an edge image showing a digital representation of a check exhibiting a skew angle, depicting upper and lower (diagonal) "regions of interest," according to one embodiment.
Figure 12A:
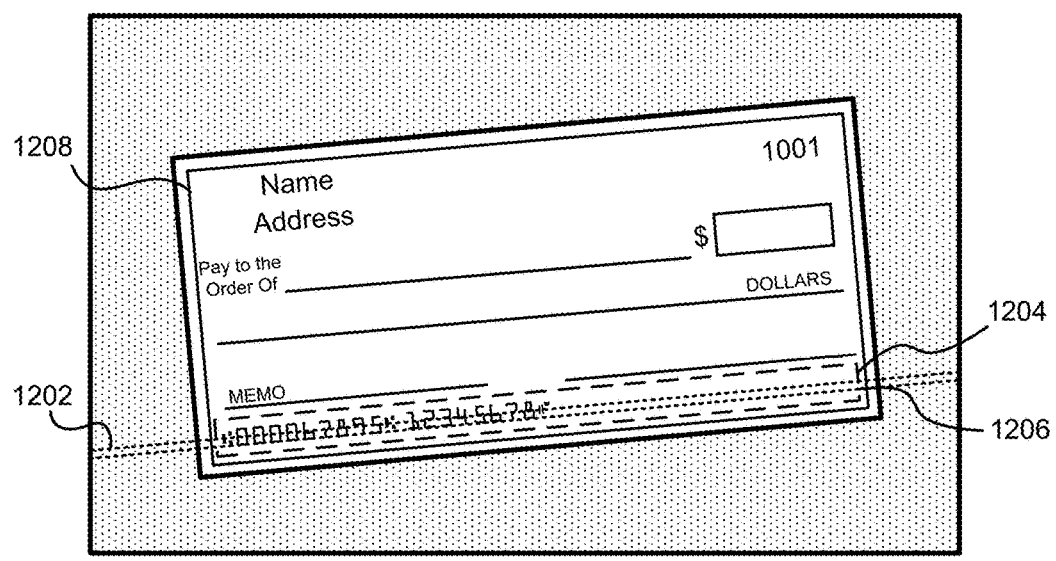
FIG. 12A is schematic representation of an image of a check, and further depicts a lines defining a baseline and center line of a plurality of reference objects, according to one embodiment.

In a preferred approach, whether or not image quality analysis is performed prior to the detection stage, detection includes finding reference objects in the original image via the use of several thresholds in order to create binary images, e.g. as shown in FIGS. 5-6 and 10-11 in some approaches, within which connected components of reasonable size and aspect ratio are normalized and scaled to gray (for example, connected components having a size and/or aspect ratio within approximately 0.1-10% of expected reference object size and/or aspect ratio, such as a size and aspect ratios of reference object bounding boxes as defined by the MICR specification, MRZ specification, or other equivalent specification as would be understood by a skilled artisan upon reading the present descriptions). As shown in FIG. 12A, the reference objects are located within one or more predefined regions 1204 known a priori to have a high likelihood of depicting reference objects suitable for document detection and orientation as described herein.

These normalized images are preferably presented to a Neural Net trained on an appropriate set of reference object images, e.g. of MICR characters, rotated at arbitrary angles vs. a collection of non-reference objects, e.g. characters of usual business fonts, thus forming a pool of candidate components.

Then, in various embodiments, a straight line is fitted to the centers of these candidates, preferably using a least-mean-squares (LMS) analysis. Assuming that the training of the Neural Network was properly accomplished, false positives are minimized such that the LMS approximation returns a line linking the actual reference objects, e.g. center line 1202 as depicted in FIG. 12A. In the following discussion it is assumed that this line goes along the width of the image; if it goes top to bottom the processing is changed accordingly.

Estimation of the Characteristic Reference Object Height.

Tops and bottoms of the components as projected along the slope of the center line determine the heights of these components; those that do not deviate significantly (e.g. 20%) from the median height are labeled as reference objects of the appropriate type, e.g. MICR characters. Naturally, special reference objects and some of others with image quality problems can be missed; however, when the found subset is sufficient to fit slightly curved lines (parabolas in the preferred implementation) to tops and bottoms of the found reference objects it is possible determine a likely region, such as a corridor spanning the height or width of the image, the region containing reference objects. The median height of reference objects within the corridor may be utilized to determine the estimated reference object height in the photograph, in some approaches.

Determination of the Orientation of the Reference Object Characters.

In some approaches, orientation of reference objects is determined after all the corresponding connected components are deskewed using a determined angle of the reference objects center line. This may be presented to another Neural Network trained to distinguish properly oriented reference objects from 180-degree rotated versions. Some of the reference objects are 180-degree rotation invariant, but in practice the reference objects line is highly likely to contain several non-invariant characters. In some approaches, a majority vote regarding character orientation may be taken, and if the majority vote is inconclusive, the side of the corridor closer to the corresponding frame edge may be chosen as the bottom.

Find and Recognize Individual Reference Object Characters in the Original Image.

The found equations of top and bottom lines of the corridor allow estimation of the reference object component heights, which may be dependent on reference object positions within the corridor. This, in several approaches, occurs because the distances between the curves are orthogonal to the general direction of the reference object center line. According to preferred approaches, where the document type is a check and the reference objects include MICR characters, the height of MICR characters is approximately 0.117" and right edges of characters are aligned on a grid with 0.13" step.

In these preferred approaches, the algorithm proceeds by finding distances between right edges of known character components (next to previous) and using the expected grid step in the position of each character decide how many grid steps separate each pair. The actual grid steps (if necessary, actual distance divided by the number of steps) may be used to fit a linear progression to approximate step sizes—this advantageously allows the algorithm to compensate for projective effects of camera capture.

In still more approaches, the algorithm proceeds by determining the best offset of progression of step sizes, and thus the expected positions of right edges of sequential reference objects within the corridor. Again with reference to an exemplary embodiment where the document is a personal check, the maximum width of a MICR character is 7*0.013" or 70% of the grid step, so all connected components within a few pixels of the expected boxes with tops and bottoms formed by the corridor top and bottom, right sides—by estimated grid positions and left sides based on the local estimation of the maximum character grid are cropped out, rotated and scaled to the preferred height, then presented to the reference object recognition Neural Network mentioned above.

Creating a Scaled Down Version of the Image.

In order to mitigate non-linear effects of camera capture, as well as achieve a further computational cost advantage, the rest of processing optionally uses a scaled down version of the original image. The integer coefficient for scaling in the preferred implementation is chosen in such a way as to limit the longer side of the frame to approximately 400-450 pixels.

Determination of the Corridor Containing the Bottom of the Document.

According to one embodiment where the document is a personal check, the line of MICR characters is known, a priori, to be located between $7/16"$ and $3/16"$ from the bottom of the check. Given the distortions frequently created by camera-based capture, these constraints are preferably relaxed (for example, in one approach the region of search for the bottom of the check can be defined as a corridor in the image parallel and below the MICR line but no more than $10/16"$ rather than $7/16"$ from it). Regardless, the a priori knowledge provides rather tight bounds on the top and bottom of the corridor containing the bottom of the document. The slope of this corridor typically will not deviate much from the slope of the reference object center line, e.g. center line 1202 or the reference object baseline 1206. Assuming that the document fills at least half of the frame width it is possible to allow the bottom corridor (e.g. regions 404, 604, 904 and/or 1104 as shown in FIGS. 4, 6, 9, and 11, respectively) to stretch all the way left and right.

Determination of the Corridor Containing the Top of the Document Side.

Given known document sizes it is possible to estimate the bounds on the document height from the estimated reference object. In one approach involving personal checks, where the reference objects are MICR characters, estimated character height is approximately 0.117". Generally speaking, given the distortions created by camera capture these constraints may have to be relaxed. However, in practice the estimated height of reference objects still provides useful bounds on the top and bottom of a corridor containing the top of the document.

While the slope of this upper corridor (e.g. regions 402, 602, 902 and/or 1102 as shown in FIGS. 4, 6, 9, and 11, respectively) can deviate more from the slope of the reference object center line than that of the bottom, it is still constrained according to assumptions listed above. In embodiments where the document image fills at least half of the frame width it is possible to allow the top corridor to stretch all the way left and right.

Allowing the corridor to stretch the entire span of the image increases the likelihood of detecting the document edge, even where a portion of the document may be cut off from the image frame. In more approaches, it may be advantageous to define a sub-region within but not covering the entire span of the image frame, to further reduce computational cost of detecting document edges.

Creation of Top and Bottom Edge Images.

A variety of known techniques can be used to create "edge images" that are used to detect most prominent of approximately straight lines corresponding to check edges and edges of inner frames. In the preferred implementation the CIE LUV next-to-previous point-to-point color differences are calculated within the respective corridor in the vertical direction. These differences are analyzed in order to determine edge strength.

In various embodiments, the formula for edge strength may differ between top and bottom: a good bottom edge point should have neighbors, in a 3×3 window, such that the smallest value in the bottom row should preferably be higher than the maximum value in top and middle rows; for good top edges the smallest value in the top row should preferably be higher than the maximum value in bottom and middle rows. Non-negative edge strengths are then thresholded at some level determined by the desired sensitivity.

In the preferred implementation this threshold is approximately $\frac{1}{256}$ of the maximum edge strength value over the corridor. The resulting binary image, e.g. as shown in FIGS. 6 and 11, in various approaches, contains the detected top edge and bottom edge points. In these exemplary embodiments, the real top and bottom of the checks in these images are quite well visible, but remain surrounded by noise as well as false positive document edge points corresponding to color transitions in the image background.

Detection of the Best Top and Bottom Edge Projections.

In various embodiments, the algorithm proceeds by determining the best angle and offset of the line associated with the highest count among projections of all edge points within respective upper and lower corridors. In some embodiments, the determination may be based on LMS approximation. After this line is determined, all the edge points within a small distance (e.g. a pixel equivalent of the estimated MICR height) of this line are ignored and other high-count projections along this direction plus and minus a small deviation (e.g. 1.0 degree) are found, thus pointing to essentially parallel edge lines.

In some embodiments, the strongest projection often corresponds not to the true document edge, but rather to an inner frame or border present on the document, as is often the case for checks and many types of IDs and one embodiment of which is depicted as border 1208 in FIG. 12A. Thus, a line parallel or almost parallel (in some approaches, due to projective effects it may not be exactly parallel) to this inner frame or border may correspond to the document edge.

Subsequently, in preferred approaches the search process is repeated for noticeably smaller and larger angles and alternative projection peaks (controlled by a parameter (e.g. 1.0 degree), each being characterized by a unique angle, offset, and strength, are found. Those projections that are weaker than a certain percentage (e.g. 70%) of the maximum strength projection are eliminated from consideration entirely, and the remaining projections are designated as candidates for the direction and position of the true document edge.

Determination of the LMS Lines for Top and Bottom.

In most documents, there is no suitably consistent content near the edges from which to leverage a priori information for the purpose of edge detection and/or orientation. However, this is not the case for all documents, for instance it is possible to leverage the inner frames or borders often present on checks and IDs to compute a location of the true document edge.

For instance, in one embodiment, it is possible to compute edge location using a priori knowledge regarding the location of the inner frame or border. Since the inner frames or borders are not typically far from the true document edge, it is possible to use the inner frames or borders to determine the vertical span of corridors within which to look for left and right check edges, and/or top and bottom document edges.

Figure 12B:
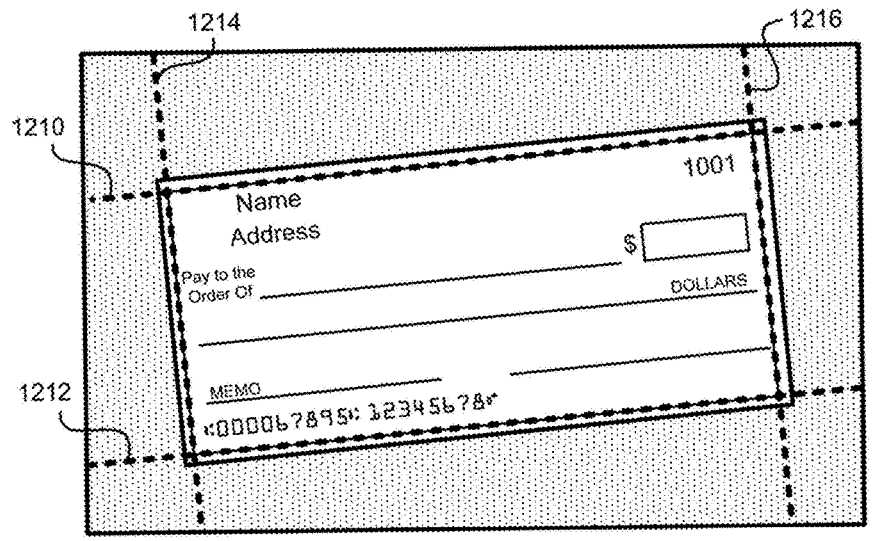
FIG. 12B is schematic representation of an image of a check, and further depicts a plurality of segmenting lines defining regions and/or elements of interest within the image according to one embodiment.

As shown schematically in FIG. 12B, and using a process substantially as described above for determining top and bottom border lines, it is possible to locate the edges of the inner boundary or frame, and define the edges of the border or frame as one edge of the corridor by projecting the border edge along the entire vertical or horizontal span of the image frame, e.g. as represented in FIG. 12B by projections 1210-1216. According to this implementation, it is possible to define vertical corridors to the left of projection 1214 and/or to the right of projections 1216, within which to search for the left and right document edges, respectively. Similarly, it may be advantageous in some approaches to define a horizontal corridor above projection 1210 and/or below projection 1212 within which to search for the upper and lower document edges.

In one approach, the inner frames are between 0.3" and 0.5" from the true edge of the document. This is distance may be translated into pixels based on a priori knowledge regarding the reference object dimensions, e.g. knowledge that MICR character height is 0.117".

In more embodiments, and particularly where no inner frame or boundary such as boundary 1208 is depicted on the document, defining corridors (or regions of interest, as referred to elsewhere herein) is preferably based on a priori knowledge regarding the reference object and/or document geometric characteristics and location. The result of this process is shown schematically in FIG. 12C, according to one embodiment.

Figure 12C:
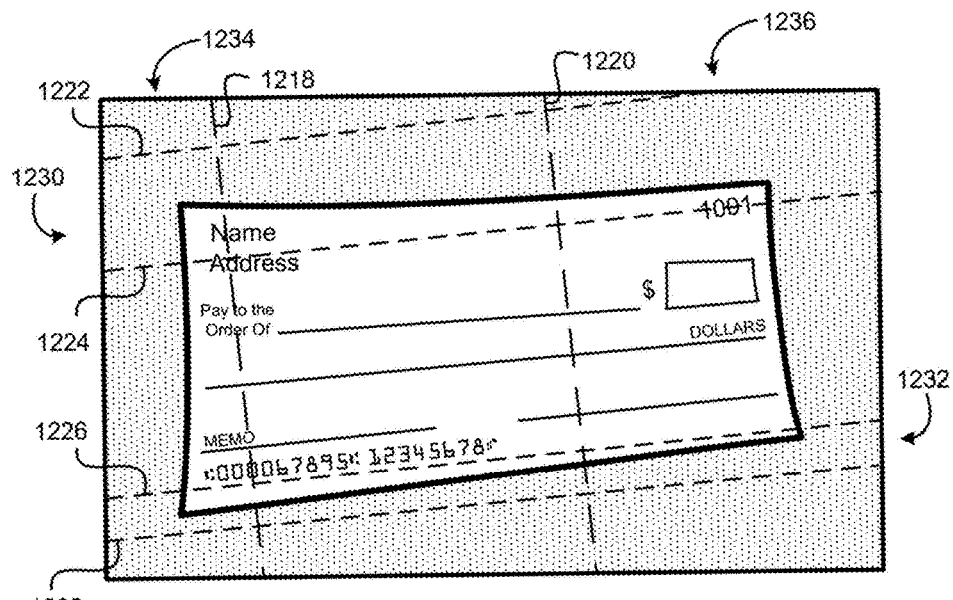
FIG. 12C is schematic representation of an image of a check, and further depicts a plurality of segmenting lines defining regions and/or elements of interest within the image according to one embodiment.

As shown in FIG. 12C, following the location of reference objects as described above, and estimation of a reference object line such as a center line 1202 and/or baseline 1206 (as shown in FIG. 12A), a plurality of corridors 1230-1236 may be defined by respective boundaries 1218-1228.

For instance, and according to the embodiment depicted in FIG. 12C, a lower corridor 1232 may be defined, e.g. based on knowledge regarding distance between reference object line 1202 and/or 1206 and a bottom edge of the document type being imaged. The lower corridor 1232 may be defined in a region between lines 1226 and 1228 as shown in FIG. 12C. Similarly, an upper corridor 1230 may be defined and situated in a region between lines 1222 and 1224 as shown in FIG. 12C.

Determination of the LMS Projections for Left and Right Edges.

A very similar process is used to create left and right edge images and determine candidate peaks associated with left and right edges. The difference is in the direction of CIE LUV differences needed to calculate directional edge strength values, i.e. horizontal rather than vertical. In preferred approaches the angles of allowed projections are determined by the direction orthogonal to the reference object center line, plus and minus an allowed range controlled by a parameter (e.g. 15 degrees).

Fine-Tuning of the Estimated MICR Character Height.

The tetragon formed by the projections (e.g. LMS lines) of the four edges can be used to correct the projective effects in the document image. The height of the reference object corridor after such correction can be reverse-transformed to the original image and used to limit the possible distances between inner frames and document edges within the original image. The candidate peaks further out are removed from consideration; also removed are peaks with angles too different from the angle of the corresponding LMS line, e.g. within five degrees of one another in preferred approaches, within three degrees of one another in more preferred approaches, and within one degree of one another in particularly preferred approaches.

The closest surviving outer peak is a strong candidate for the crop line; the only alternative may be the second outer peak that is very close to the first—this may happen if the document has a "double" frame. In practice both crop-in and crop-out happen, but rather infrequently. Crop-out can be caused by very close parallel content, for example, when the document is placed near and parallel to the edge of an extraneous object like a keyboard; crop-in—by missing the actual edge placed on background of very close color, for example, a document with a white frame against a white sheet of paper. Still, these crop line errors are relatively harmless because they do not affect the correction of projective effects and cannot be too large. For example, in one approach the rectangularization is performed based on the LMS lines. If these go along inner frames it is even better because they are parallel to the edges and, being inside of the document, are found with even greater confidence than document edges.

Accordingly, and with continuing reference to FIG. 12C, left and right corridors 1234, 1236, respectively may be defined in a left and right region of the image frame, and may be defined to span the region between the left or right edge of the image and a single bounding line 1218, 1220 rather than dual bounding lines 1222-1228 as indicated for upper and lower regions 1230, 1232 in FIG. 12C. Of course, in other approaches dual bounding lines may be utilized to reduce computational cost of searching for left and right document edges in the respective corridors 1234, 1236.

The manner of determining reference object location within the image, utilizing reference object geometric characteristics and/or location, document geometric characteristics, and/or any other suitable a priori or determined information may follow any technique discussed herein, or any combination of such techniques, in various approaches.

Figure 13:
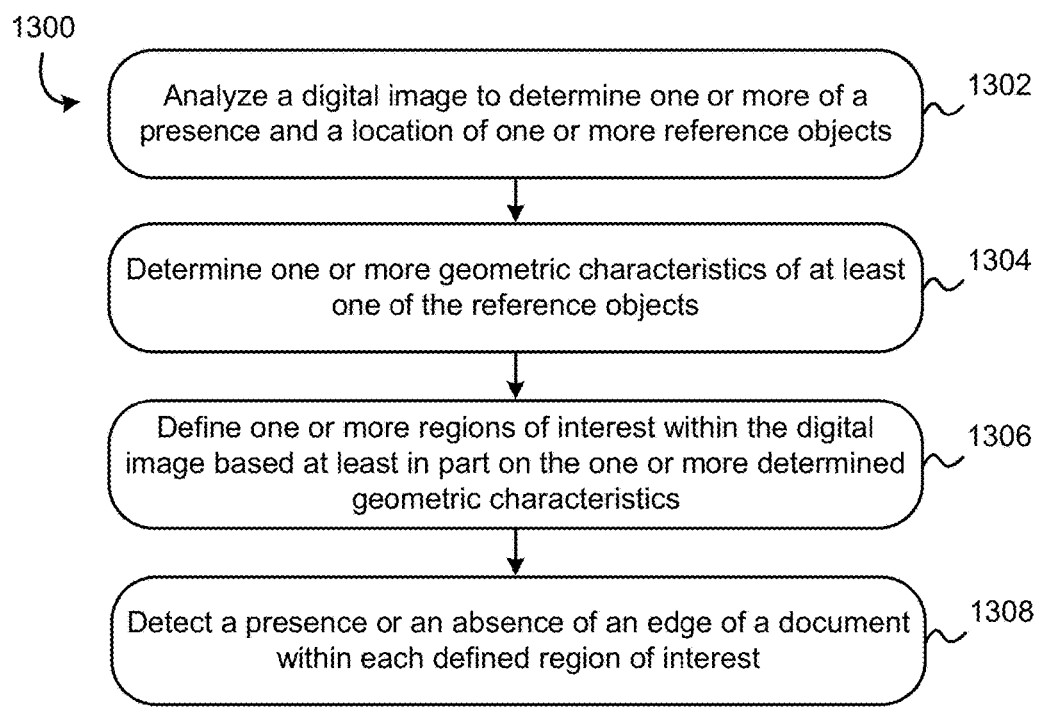
FIG. 13 is a flowchart of a method, according to one embodiment.

Now referring to FIG. 13, a flowchart of a method 1300 is shown according to one embodiment. The method 1300 may be performed in accordance with the present invention in any of the environments depicted in FIGS. 1-12C, among others, in various embodiments. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 13, method 1300 may initiate with operation 1302, where a digital image is analyzed to determine a presence and/or location of one or more reference objects depicted in the digital image.

As shown in FIG. 13, method 1300 may continue with operation 1304, where geometric characteristic(s) of the reference object(s) are determined. Geometric characteristics may include any suitable feature of the reference objects as described herein and would be understood to a person having ordinary skill in the art upon reading the present descriptions. For example, geometric characteristics may include size, aspect ratio, width, height, shape, contour, etc.

As shown in FIG. 13, method 1300 may also include operation 1306, where one or more region(s) of interest are defined based in whole or in part on one or more of the determined geometric characteristics. The determination may also be based in whole or in part on a location of the reference object(s), in various approaches. Preferably, geometric characteristics and location information are utilized in conjunction.

As shown in FIG. 13, method 1300 may proceed according to operation 1308, where edge(s) of the document are detected as either being present or absent in each region of interest defined based on the geometric characteristics and/or location information.

Figure 14:
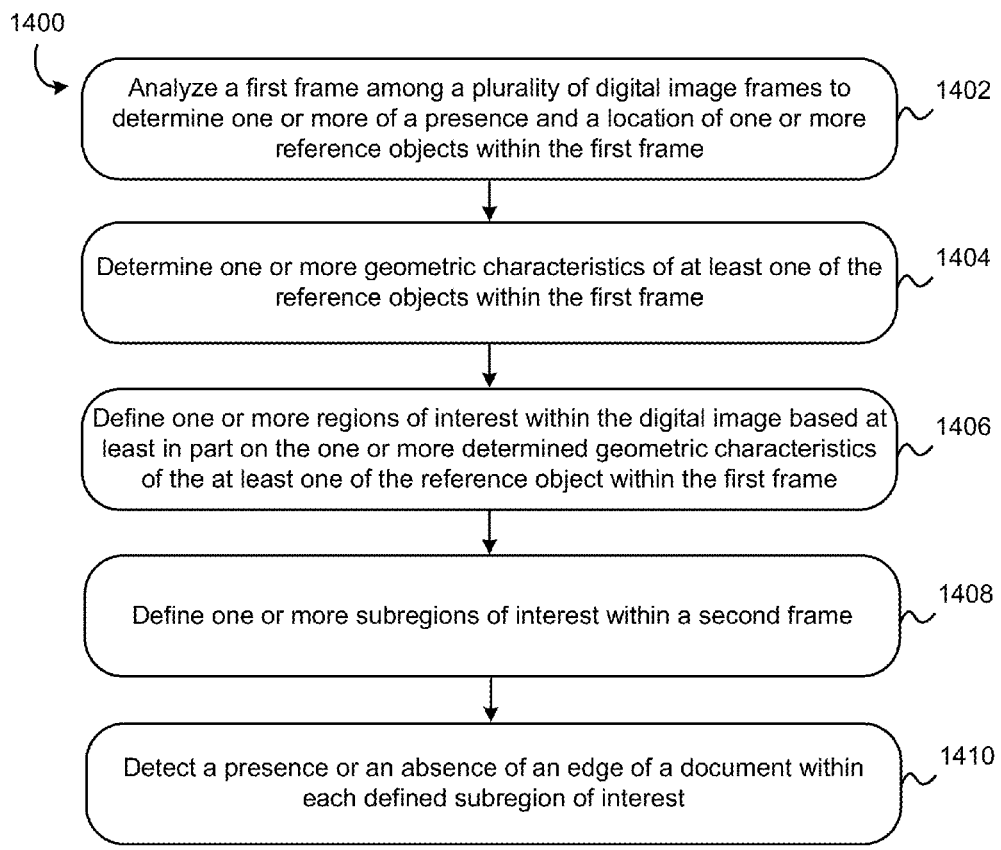
FIG. 14 is a flowchart of a method, according to one embodiment.

Now referring to FIG. 14, a flowchart of a method 1400 is shown according to one embodiment. The method 1400 may be performed in accordance with the present invention in any of the environments depicted in FIGS. 1-12C, among others, in various embodiments. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

Method 1400 leverages similar techniques as discussed above with respect to method 1300, but applies these techniques to multiple image frames to confer additional advantage, in various embodiments.

As shown in FIG. 14, method 1400 may initiate with operation 1402, where at least a first frame among the multiple frames is analyzed to determine presence and/or location of one or more reference objects therein.

As shown in FIG. 14, method 1400 may continue with operation 1404, where geometric characteristics and/or a location of the reference object(s) are determined.

As shown in FIG. 14, method 1400 may also include operation 1406, where a region or regions of interest are defined based in whole or in part on the geometric characteristic(s), the location information, or preferably both.

As shown in FIG. 14, method 1400 may proceed according to operation 1408, where one or more subregion(s) of interest are defined within a second frame among the multiple frames. The subregion(s) of interest are each preferably defined within one of the regions of interest defined based on the geometric characteristics and/or location information. In this manner, operation 1408 may operate as a "narrowing" of the defined region of interest to facilitate, e.g. more accurate, consistent edge detection, more computationally efficient edge detection, etc. as would be understood by a person having ordinary skill in the art upon reading the present descriptions.

Preferably, the subregions of interest are defined based in whole or in part on at least one of: one or more geometric characteristics of at least one of the region(s) of interest within which the subregion of interest was defined; and one or more of the determined geometric characteristics of the reference object(s) within the first frame.

As shown in FIG. 14, method 1400 may include operation 1410, where document edge(s) are detected as being either present or absent from the subregion(s) of interest.

Figure 15:
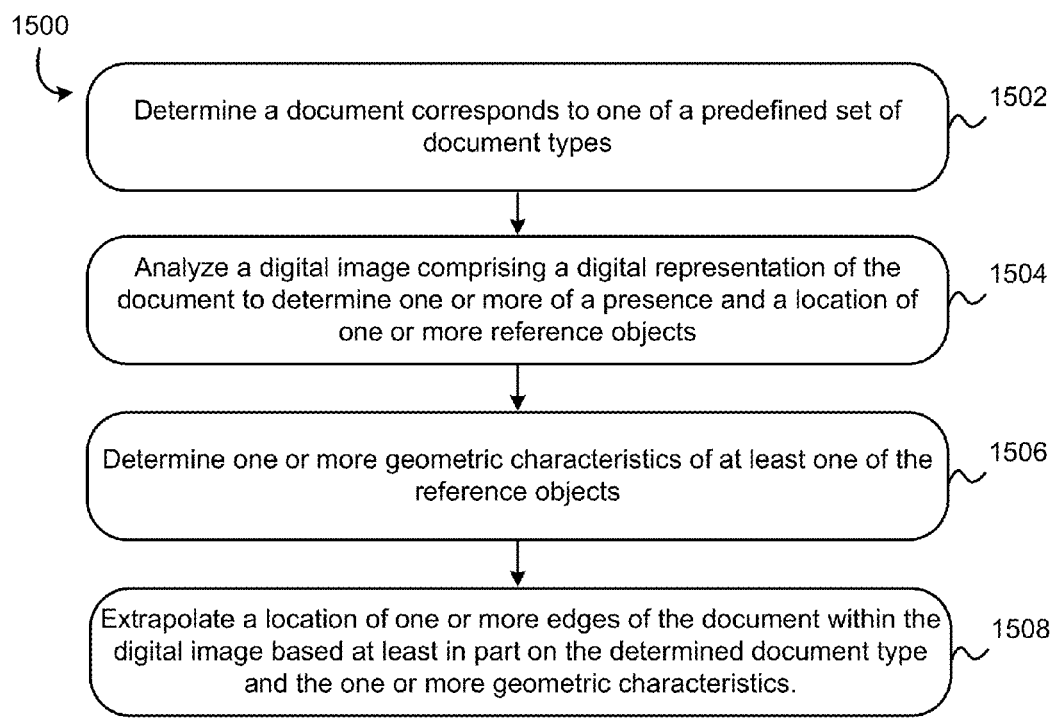
FIG. 15 is a flowchart of a method, according to one embodiment.

Now referring to FIG. 15, a flowchart of a method 1500 is shown according to one embodiment. The method 1500 may be performed in accordance with the present invention in any of the environments depicted in FIGS. 1-12C, among others, in various embodiments. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 15, method 1500 may initiate with operation 1502, where the document is analyzed to determine whether the document corresponds to one of a predefined set of document types, e.g. personal check, business check, letter, identity document, passport, driver's license, etc.

As shown in FIG. 15, method 1500 may continue with operation 1504, where the digital image is analyzed to determine presence and/or a location of one or more reference objects depicted in the document.

As shown in FIG. 15, method 1500 may also include operation 1506, where one or more geometric characteristics of the reference object(s) are determined.

As shown in FIG. 15, method 1500 may proceed according to operation 1508, where a location of one or more edges of the document within the digital image are extrapolated based at least in part on the determined document type and the one or more geometric characteristics.

As noted above, the presently disclosed inventive detection techniques are suitable for detecting documents in single, still images. However, it is also entirely appropriate to apply these concepts to detection using video data.

Exemplary Video-Based Check Detection and Orientation

In one particular embodiment where video data are utilized to detect and/or orient image(s) of checks, the algorithm may proceed for instance according to the exemplary approach described below.

For the simplified case when the check image has no skew, i.e., the edges of the check image are either horizontal or vertical, at first edge images in different regions may be derived using subsampled color differences in RGB space. The edge images in different regions may be normalized by brightness separately. After that, the binary edge images may be derived from the edge image with a threshold. Following the above steps, the binary edge images may be projected either vertically or horizontally to get the accumulated edge strength signals along vertical and horizontal directions. Then, the check edge candidates may be estimated by the peak of accumulated edge strength signals either in horizontal or vertical direction. The corners of check bounding box may be estimated by the intersection points of check edge candidates.

The reliability of the check edge candidates may be measured by confidence score. Confidence scores for the bounding box may be estimated based on: 1) confidence scores for the four edges, which may be computed as the number of white pixels divided by the total number of pixels on the edge; 2) Aspect ratio confidence score, which may be estimated by comparing the estimated aspect ratio of the detected bounding box and the aspect ratios of real checks; 3) color consistency confidence, which may be measured by the color variations in the detected bounding box; and 4) the confidence of the detected bounding box size, which may be measured by its size. A threshold may be set to filter out small false positives. The threshold settings for different confidence scores may be derived by validation data, and may be defined by default to a value of 0.65 (especially in embodiments where, as above, the value of one or more scores, and preferably each score, is defined in a range from 0 to 1.0).

The confidence scores derived in the first pass as mentioned above may be rescored with following boundary re-estimation. The edges detected in the first pass may be used as starting points; alternative angles and shifts may be re-evaluated by computing the accumulated edge strength signals. If better candidates may be found, the original confidence scores and the bounding box may be updated.

Motion information may also be employed to help check edge detection. Under the condition of small camera movement, if there are consecutive frames in which the system has detected the check bounding box with lower confidence scores of edge strength, but high confidence score of shape, the system will conclude that there is likely a high chance that the detected bounding box contains the check image.

Textual location information in check front helps to locate check edges. Because check front and check back share the same shape, the techniques mentioned in the above section for check back detection can be directly applied to check front detection. Except for color consistency assumption for check backs, other techniques can be applied to check front detection.

Textual layout information of check front, such as the MICR line, and check number in the top right corner, may be employed to estimate potential regions of search for check edges. The DPI information and position of MICR line and digits at the top right corner may be applied to estimate regions of interest in which check edges may exist. Specifically, the DPI information may be applied to estimate check height in pixels. The start and end positions of the MICR line may be applied to estimate the check skew angle. The position of the check number in the top right corner may be employed to estimate the right and top boundaries of the regions of interest.

Since the MICR line skew angle is the same as that of the check, the original image or edge image may be rotated into the image plane without skew via use of this angle. Then the check detection algorithm for check without skew may be applied to the rotated image or the rotated edge image. The detected check bounding box from the deskewed image may be rotated back to the original image plane. In this way, the rotated check bounding box may be derived. The confidence scoring approach for check detection without skew may also be directly applied to the rotated image. The confidence score of MICR line and digits in the top right corner of check fronts may be measured by MICR detector and the results of digit recognition using OCR.

The foregoing discussions have been provided primarily with reference to an exemplary embodiment involving a document such as a check and reference objects such as MICR characters. Of course, other types of documents such as IDs may advantageously be imaged and processed in a substantially similar manner as discussed above. In particular, embodiments in which IDs are the document type depicted in the image may leverage MRZ characters as the preferred reference object type, and detecting the MRZ characters may include detecting multiple lines (e.g. center line 1202, baseline 1206 as shown in FIG. 12A) since certain types of IDs such as passports may include multiple lines of MRZ characters.

Accordingly, determining the skew angle and/or reference object line may leverage the presently disclosed inventive techniques on one of the multiple lines, or several of the multiple lines, in various embodiments. Where multiple lines are utilized, each line may serve as an independent measure for determining confidence scores, or confidence scores may be combined to provide an overall confidence measure, in more approaches.

In the particular case where a passport or other type of folded document is imaged and processed according to the presently disclosed techniques, it may be particularly challenging to identify edges positioned in the central fold region of the document. Without wishing to be bound to any particular theory, the inventors presume this difficulty may be due in part to the relative similarity between the color profile and brightness of the adjacent pages. Although the central fold may be darkened by a shadow, or a physical line may be present (due to a break between pages on either side of the fold), the relative contrast between these regions is relatively low as compared to a typical document/image background contrast difference.

Accordingly, in preferred approaches processing documents folded in this manner is particularly advantageous to leverage a priori knowledge regarding the aspect ratio of the document. Where, for example, a document is positioned such that the document's longitudinal axis is oriented vertically in the image, it is useful in one approach to determine bottom, left, and right edges of the unfolded document as described hereinabove, and then calculate or predict a vertical distance where the fold or break is likely to appear. Similarly, this approach may be leveraged to define a relatively narrow, horizontal corridor spanning the vertical center point of the document and within which to conduct a search for the fold, break, etc. representing the edge between the pages of the folded document.

In another embodiment, a method, system, and/or computer program product within the scope of the present disclosures may be characterized by all of the preceding features and/or include performing all of the preceding operations.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for processing a digital image depicting a document, the method comprising:
analyzing, using a processor of a mobile device, the digital image to detect one or more of a presence and a location of one or more reference objects;
detecting, using the processor of the mobile device, one or more geometric characteristics of at least one of the reference objects, wherein the one or more geometric characteristics are selected from: a height of the at least one of the reference objects, an average height of the at least one of the reference objects, a width of the at least one of the reference objects, an average width of the at least one of the reference objects, an aspect ratio of the at least one of the reference objects, an average aspect ratio of the at least one of the reference objects, an area of the at least one of the reference objects, an average area of the at least one of the reference objects, and a contour of the at least one of the reference objects;
defining, using the processor of the mobile device, one or more region(s) of interest of the digital image within which to search for one or more edges of the document, the region(s) of interest being defined based at least in part on one or more of the detected geometric characteristics; and
detecting, using the processor of the mobile device, a presence or an absence of one or more of the edges of the document within each defined region of interest;
estimating a bounding box for the document based on the detected presence or absence of the edge of the document within each defined region of interest; and
estimating a confidence score of the bounding box based on one or more of:
confidence scores computed for each side of the bounding box;

a confidence score of an estimated aspect ratio of the bounding box; and
a color consistency confidence score.

2. The method as recited in claim 1, wherein the geometric characteristics comprise:
the aspect ratio of the at least one of the reference objects.

3. The method as recited in claim 1, wherein detecting the presence of the edge of the document within each defined region of interest further comprises locating a transition from a background region of the digital image to a non-background region of the digital image within the defined region of interest;
wherein the non-background region of the digital image depicts at least a portion of the document; and
wherein the background region of the digital image does not depict the document.

4. The method as recited in claim 3, wherein the detecting further comprises;
determining a longitudinal axis of the located transition; and
determining whether the longitudinal axis of the located transition corresponds to a longitudinal axis of a region encompassing the one or more reference object(s).

5. The method as recited in claim 4, wherein the longitudinal axes are determined to correspond in response to determining one or more of the following conditions are met:
the longitudinal axes are substantially parallel;
the longitudinal axes are substantially perpendicular; and
at least three points along the longitudinal axis of the located transition are each located within a threshold distance of at least three corresponding points along the longitudinal axis of the region encompassing the one or more reference object(s).

6. The method as recited in claim 1, wherein the reference object(s) comprise one or more of magnetic ink character recognition (MICR) characters and machine readable zone (MRZ) characters.

7. A computer-implemented method for processing a plurality of digital image frames, each frame comprising at least a partial digital representation of a document, and the method comprising:
analyzing, using a processor of the computer, a first frame among the plurality of frames to determine one or more of a presence and a location of one or more reference objects within the first frame;
detecting, using the processor, one or more geometric characteristics of at least one reference object within the first frame, wherein the one or more geometric characteristics are selected from: a height of the at least one reference object, an average height of the at least one reference object, a width of the at least one reference object, an average width of the at least one reference object, an aspect ratio of the at least one reference object, an average aspect ratio of the at least one reference object, an area of the at least one reference object, an average area of the at least one reference object, and a contour of the at least one reference object;
defining, using the processor, one or more region(s) of interest of the first frame within which to search for one or more edges of the document, the one or more region(s) of interest being defined based at least in part on:
a priori knowledge regarding a relative position of the at least one reference object within the document; and
one or more of the determined geometric characteristics of the at least one reference object within the first frame;
defining, using the processor, one or more subregion(s) of interest within which to search for the one or more edges of the document, the one or more subregion(s) of interest being defined within a second frame;
detecting, using the processor, a presence or an absence of the one or more of the edges of the document within each defined subregion of interest;
wherein each subregion of interest is defined based at least in part on:
one or more geometric characteristics of at least one of the region(s) of interest within which the subregion of interest was defined; and
one or more of the geometric characteristics of the reference object(s) detected within the first frame; and
estimating a bounding box for the document based on the detected presence or absence of the edge of the document within each defined region of interest; and
estimating a confidence score of the bounding box based on one or more of:
confidence scores computed for each side of the bounding box;
a confidence score of an estimated aspect ratio of the bounding box; and
a color consistency confidence score.

8. The method as recited in claim 7, wherein the geometric characteristics comprise:
the aspect ratio of the at least one reference object.

9. The method as recited in claim 7, wherein detecting the presence of the edge of the document within each defined subregion of interest further comprises: locating a transition from a background region of the digital image to a non-background region of the digital image within the defined region of interest
wherein the non-background region of the digital image depicts at least a portion of the document; and
wherein the background region of the digital image does not depict the document.

10. The method as recited in claim 9, wherein detecting the presence or the absence of the one or more of the edges of the document within each defined subregion of interest further comprises:
determining a longitudinal axis of the located transition; and
determining whether the longitudinal axis of the located transition corresponds to a longitudinal axis of the subregion encompassing the one or more reference object(s).

11. The method as recited in claim 10, wherein the longitudinal axes are determined to correspond in response to determining one or more of the following conditions are met:
the longitudinal axes are substantially parallel;
the longitudinal axes are substantially perpendicular; and
at least three points along the longitudinal axis of the located transition are each located within a threshold distance of at least three corresponding points along the longitudinal axis of the subregion encompassing the one or more reference object(s).

12. The method as recited in claim 7, wherein the reference object(s) comprise one or more of magnetic ink character recognition (MICR) characters and machine readable zone (MRZ) characters.

13. The method as recited in claim 7, wherein each subregion of interest is characterized by satisfying one or more of the following criteria:
- each subregion of interest is located within a corresponding region of interest defined for the first frame;
- each subregion of interest shares at least one boundary with a corresponding region of interest defined for the first frame;
- each subregion of interest encompasses an entirety of a corresponding region of interest defined for the first frame;
- each subregion of interest encompasses a region bounding a corresponding region of interest defined for the first frame; and
- each subregion of interest excludes an area encompassed by a corresponding region of interest defined for the first frame.

14. A computer-implemented method for processing a digital image comprising a digital representation of a document, the method comprising:
- determining, using a processor of the computer, the document corresponds to one of a predefined set of document types;
- analyzing, using the processor, the digital image to determine a location of one or more reference objects within the document;
- detecting, using the processor, one or more geometric characteristics of at least one of the reference objects, wherein the one or more geometric characteristics are selected from: a height of the at least one of the reference objects, an average height of the at least one of the reference objects, a width of the at least one of the reference objects, an average width of the at least one of the reference objects, an aspect ratio of the at least one of the reference objects, an average aspect ratio of the at least one of the reference objects, an area of the at least one of the reference objects, an average area of the at least one of the reference objects, and a contour of the at least one of the reference objects;
- extrapolating, using the processor, a location of one or more edges of the document within the digital image based at least in part on: the determined document type, the determined location of the one or more reference objects, and the detected geometric characteristics of the at least one of the reference objects; and
- estimating a bounding box for the document based on the extrapolated location of the one or more edges of the document; and
- estimating a confidence score of the bounding box based on one or more of:
  - confidence scores computed for each side of the bounding box;
  - a confidence score of an estimated aspect ratio of the bounding box; and
  - a color consistency confidence score; and
- outputting the bounding box, the extrapolated location of the one or more edges of the document, or both to a display of a mobile device.

15. The method as recited in claim 14, further comprising:
- defining one or more region(s) of interest within the digital image based at least in part on the extrapolated document edge location(s) and one or more of the detected geometric characteristics; and
- detecting a presence or an absence of a true edge of the document within each defined region of interest.

16. The method as recited in claim 14, wherein the geometric characteristics comprise:
- the aspect ratio of the at least one of the reference objects.

17. The computer-implemented method as recited in claim 1,
- wherein the document is characterized by at least four edges;
- wherein at least one of the edges is an interior edge defined by a fold within the document; and
- wherein at least the interior edge is detected within some or all of the one or more region(s) of interest.

18. The method as recited in claim 1, wherein the one or more reference objects comprise an inner frame or border of the document.

19. The method as recited in claim 1, wherein the confidence scores for each side of the bounding box are estimated based on a percentage of white pixels along a corresponding side of a binary edge image generated based on the digital image; and
- wherein the confidence score of the estimated aspect ratio of the bounding box is either:
  - a ratio of the estimated aspect ratio of the bounding box divided by a real aspect ratio of the document; or
  - a ratio of the real aspect ratio of the document divided by the estimated aspect ratio of the bounding box.

* * * * *